United States Patent
Niiyama

(10) Patent No.: US 8,705,197 B2
(45) Date of Patent: Apr. 22, 2014

(54) INFORMATION PROCESSING APPARATUS, PROTECTION METHOD AND MEDIUM STORING PROTECTION PROGRAM

(75) Inventor: Takayuki Niiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/584,029

(22) Filed: Aug. 13, 2012

(65) Prior Publication Data

US 2012/0300340 A1 Nov. 29, 2012

Related U.S. Application Data

(63) Continuation of application No. PCT/JP2010/001011, filed on Feb. 17, 2010.

(51) Int. Cl.
*G11B 21/02* (2006.01)

(52) U.S. Cl.
USPC .............................................. 360/75; 360/60

(58) Field of Classification Search
USPC .............. 360/75, 60, 132, 133, 69, 97.02, 31; 324/207.13, 260; 361/679.34, 679.33; 248/560
See application file for complete search history.

(56) References Cited

U.S. PATENT DOCUMENTS

| | | | | |
|---|---|---|---|---|
| 5,235,472 | A * | 8/1993 | Smith | 360/60 |
| 5,373,213 | A * | 12/1994 | Smith | 310/355 |
| 6,477,650 | B1 | 11/2002 | Kokubo | |
| 6,570,726 | B2 * | 5/2003 | Mutoh | 360/60 |
| 6,751,092 | B1 | 6/2004 | Ohnishi et al. | |
| 7,623,314 | B2 * | 11/2009 | Yamashita et al. | 360/75 |
| 7,808,740 | B2 * | 10/2010 | Tanabe | 360/75 |
| 7,956,602 | B2 * | 6/2011 | Kasajima et al. | 324/207.13 |
| 2001/0050823 | A1 | 12/2001 | Watanabe et al. | |
| 2002/0030911 | A1 | 3/2002 | Mutoh | |
| 2007/0291398 | A1 | 12/2007 | Hara et al. | |

FOREIGN PATENT DOCUMENTS

| | | |
|---|---|---|
| JP | 10-319852 | 12/1998 |
| JP | 11-134260 | 5/1999 |
| JP | 11-242881 | 9/1999 |
| JP | 2001-307417 | 11/2001 |
| JP | 2001-307449 | 11/2001 |
| JP | 2002-259066 | 9/2002 |
| JP | 2002-368439 | 12/2002 |
| JP | 2006-268925 | 10/2006 |
| JP | 2007-335010 | 12/2007 |
| JP | 2008-251129 | 10/2008 |
| WO | WO 01/04897 | 1/2001 |

OTHER PUBLICATIONS

International Search Report of PCT/JP2010/001011 mailed Apr. 6, 2010.
English Translation of the International Preliminary Report on Patentability mailed Sep. 27, 2012 in corresponding International Patent Application No. PCT/JP2010/001011.
Japanese Office Action issued Nov. 26, 2013 in Japanese Application No. 2012-500382.

* cited by examiner

*Primary Examiner* — Ali Neyzari
(74) *Attorney, Agent, or Firm* — Staas & Halsey LLP

(57) ABSTRACT

Disclosed is an information processing apparatus comprising a housing (4), a magnetic disk drive unit (6), a sensor (8) and a control unit (10). The sensor (8), which is installed between the housing and the magnetic disk drive unit, detects an external force acting on the housing or a distortion caused in the housing by dint of the external force. The control unit (10) retreats a magnetic head (14) of the magnetic disk drive unit to a retreat area when the external force or the distortion, detected by the sensor, exceeds a predetermined level.

11 Claims, 28 Drawing Sheets

INFORMATION PROCESSING APPARATUS, PROTECTION METHOD AND MEDIUM STORING PROTECTION PROGRAM

CROSS-REFERENCE TO RELATED APPLICATIONS

This is a continuation of Application PCT/JP2010/001011, filed on Feb. 17, 2010, now pending, the entire contents of which are incorporated herein by reference.

FIELD

The present embodiment discussed herein is related generally to an information processing apparatus mounted with a magnetic disk drive unit, and more particularly to an information processing apparatus configured to protect, e.g., the magnetic disk drive unit within a housing from an external force, a protection method thereof and a protection program thereof.

BACKGROUND

In the information processing apparatus such as a Personal Digital Assistant mounted with the magnetic disk drive unit, when the housing is pressed such as applying a user's body weight while the user places a hand against the housing, the pressure is applied to the magnetic disk drive unit, a head-crash of the magnetic head might be caused on the magnetic disk. This being the case, a contrivance is that the magnetic disk drive unit is prevented from breaking down by dint of this type of pressure by strengthening a structure of a mounting unit of the magnetic disk drive unit and the housing as well.

It is known that a touch sensor is installed in the information processing apparatus mounted with the magnetic disk drive unit and monitors how much the information processing apparatus gets apart from a table, thereby setting a disk device in a retreat mode when the information processing apparatus drops down (e.g., Patent document 1).

Further, it is also known that an external force applied to a display panel of the information processing apparatus is detected, and, when the pressure equal to or larger than a fixed value is applied, an alarm is given (e.g., Patent document 2).
[Patent document 1] International Publication Pamphlet No. WO01/04897
[Patent document 2] Japanese Laid-Open Patent Publication No. 10-319852

SUMMARY

An information processing apparatus of the present disclosure includes a housing, a magnetic disk drive unit to be installed within the housing, a sensor and a control unit. The sensor is installed between the housing and the magnetic disk drive unit and detects an external force acting on the housing or a distortion caused in the housing by dint of the external force. The control unit retreats the magnetic head of the magnetic disk drive unit to a retreat area when the external force or the distortion detected by the sensor exceeds a predetermined level.

A protection method of an information processing apparatus of the present disclosure includes a step of detecting an external force etc. and a step of retreating a magnetic head. The detecting step includes detecting an external force acting on the housing in which a magnetic disk drive unit is installed or a distortion caused in the housing by dint of the external force. The retreating step includes retreating the magnetic head of the magnetic disk drive unit to a retreat area when the external force or the distortion exceeds a predetermined level.

A protection program of an information processing apparatus of the present disclosure includes a function of monitoring an external force etc. and a function of retreating a magnetic head. The monitoring function includes monitoring an external force acting on the housing in which a magnetic disk drive unit is installed or a distortion caused in the housing by dint of the external force. The retreating function includes retreating the magnetic head of the magnetic disk drive unit to a retreat area when the external force or the distortion exceeds a predetermined level.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

First Embodiment

A first embodiment takes a configuration that a sensor is provided alongside of a magnetic disk drive unit and detects an external force acting on a housing or a distortion of the housing due to the external force, and a magnetic head is retreated corresponding to a level thereof.

Figure 1:
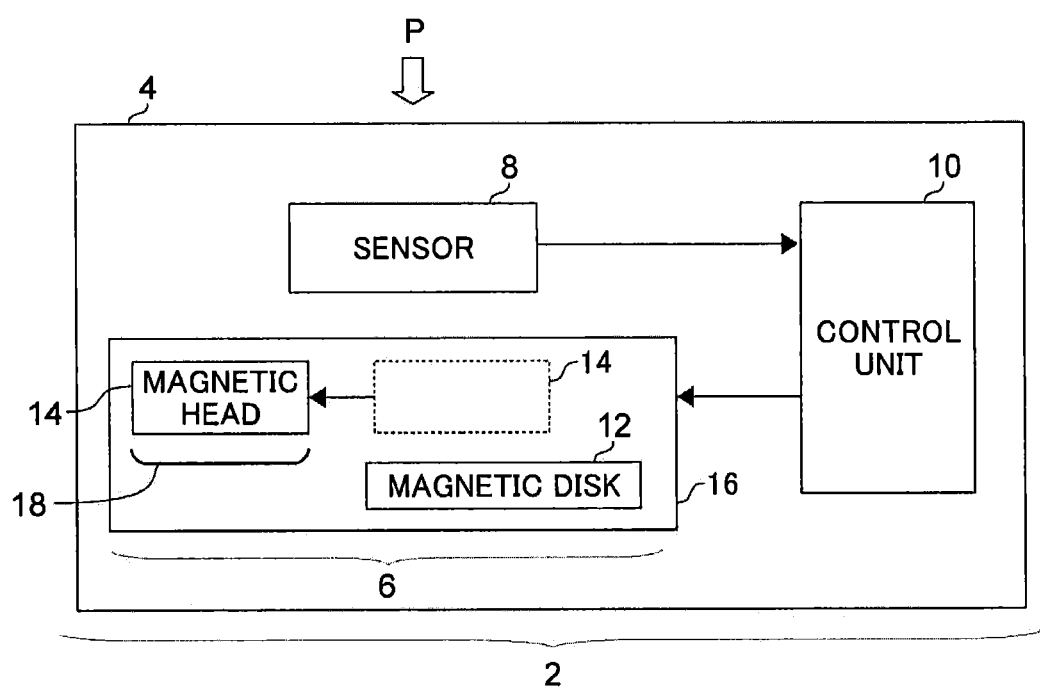
FIG. 1 is a diagram illustrating an outline of an information processing apparatus according to a first embodiment.

Reference to FIG. 1 will be made with respect to the first embodiment. FIG. 1 is a diagram illustrating one example of an information processing apparatus according to the first embodiment. An illustrated configuration is one example, and the present invention is not limited to such a configuration.

This information processing apparatus 2 is one example given by way of an information processing apparatus, a protection method thereof and a protection program thereof of the present disclosure. The information processing apparatus 2 includes a housing 4, a magnetic disk drive unit 6 (which will hereinafter be abbreviated to a "DD unit 6"), a sensor 8 and a control unit 10.

The housing 4 is an external member of the information processing apparatus 2 as well as being the member which encloses the DD unit 6, the sensor 8 and the control unit 10, and has a composition including a metal, a synthetic resin, etc.

The DD unit 6 is one example of a storage medium or a recording medium including inside at least a magnetic disk 12 and a magnetic head 14, and writes and reads the data to and from the magnetic disk 12 by employing the magnetic head 14. The DD unit 6 includes a housing unit 16 which covers the magnetic disk 12 and the magnetic head 14, and the housing unit 16 is equipped with a rotary mechanism for the DD unit 6 and a drive mechanism for driving the magnetic head 14. Further, the housing unit 16 includes a retreat area 18 that is set as a retreat location of the magnetic head 14. This retreat area 18 is set, e.g., outside a drive area of the magnetic disk 12. With this contrivance, the magnetic head 14, which has moved to the retreat area 18, is disabled from contacting the magnetic disk 12.

The sensor 8 is one example of a means to detect a pressure due to an external force applied to the housing 4 or a distortion caused in the housing 4 due to this external force, and is installed between the housing 4 and the DD unit 6. Detection information such as the pressure and/or the distortion detected by the sensor 8 is output toward the control unit 10.

The control unit 10 has a function of controlling the DD unit 6 by capturing the detection information output from the sensor 8. The control unit 10 includes, e.g., a monitoring function of the detection information of the sensor 8, a control function of controlling the drive of the magnetic head 14 and a retreat control function of the magnetic head 14. The control unit 10 may further include a control function etc. of writing or reading the information to or from the magnetic disk 12.

In such a configuration, when a pressure P is applied as the external force to the housing 4, the sensor 8 detects the pressure P or the distortion caused in the housing 4 due to the pressure P. The detection information acquired by the sensor 8 is captured and monitored by the control unit 10. If the detected pressure P or distortion exceeds a predetermined level, the control unit 10 gives a retreat control output for the magnetic head 14 to the DD unit 6. When the magnetic head 14 locates over the magnetic disk 12 as in the case that the usage of the DD unit 6 is underway, the magnetic head 14 is retreated to the retreat area 18 by canceling the normal drive for the magnetic head 14. As a result, it is feasible to prevent a head-crash of the magnetic head 14 on the magnetic disk 12, thereby protecting the magnetic head 14 and the magnetic disk 12 as well.

Figure 2:
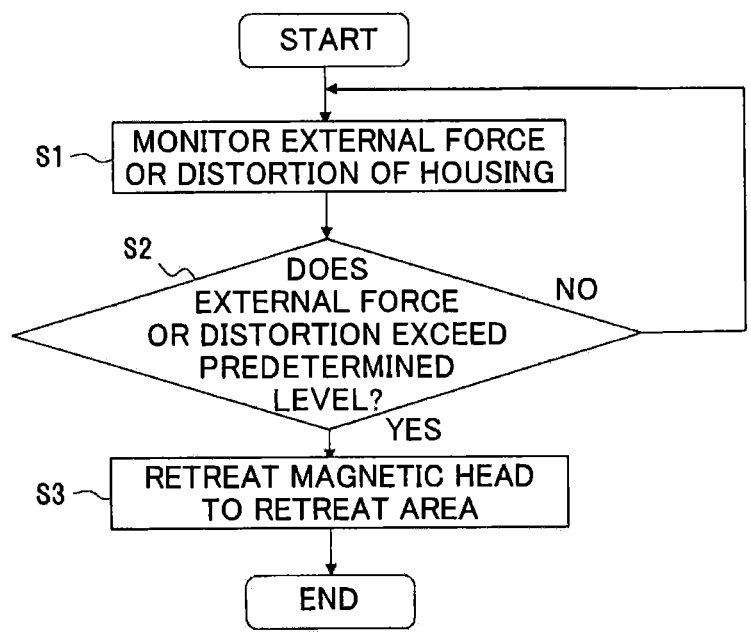
FIG. 2 is a flowchart illustrating a processing procedure of protecting a magnetic disk drive unit.

Next, the reference to FIG. 2 will be made for how the magnetic head 14 retreats. FIG. 2 is a flowchart illustrating one example of a processing procedure of protecting the DD unit.

This processing procedure is one example of a protection method and a protection program of the information processing apparatus of the present disclosure. The processing procedure includes monitoring of the external force and the distortion (step S1), determining a level of the external force or the distortion (step S2) and retreating the magnetic head (step S3).

Then, in step S1, the control unit 10 captures and monitors the detection information representing the external force or the distortion detected by the sensor 8. Next, in step S2, it is determined whether the external force or the distortion exceeds the predetermined level or not. If the external force or the distortion does not exceed the predetermined level (NO in step S2), the monitoring is continuously performed. Whereas if the external force or the distortion exceeds the predetermined level (YES in step S2), the magnetic head 14 is retreated to the retreat area 18 (step S3).

Through the processing procedure such as this, the head-crash of the magnetic head 14 on the magnetic disk 12 can be prevented, and the magnetic head 14 and the magnetic disk 12 are thus protected.

Note that in this information processing apparatus 2, the external force or the distortion is continuously monitored during the retreat of the magnetic head 14, and, if the external force or the distortion decreases under the predetermined level, the retreated magnetic head 14 may be returned to above the magnetic disk 12.

According to such a configuration, it is feasible to retreat the magnetic head before causing the head-crash of the magnetic head on the magnetic disk due to the external force applied to the housing of the information processing apparatus or due to the distortion caused by the external force. Further, the monitoring means etc. of the magnetic disk can be simplified by making use of the external force applied to the housing or the distortion state of the housing, whereby the information processing apparatus can be downsized.

Second Embodiment

A second embodiment will exemplify a specific example of the information processing apparatus including the DD unit 6. In this information processing apparatus, the pressure (external force) acting on the housing is monitored, and it is determined whether or not this pressure becomes equal to or larger than the predetermined threshold value, thereby conducting the retreat control of the magnetic head 14. Further, on the occasion of conducting the retreat control of the magnetic head 14, a user of the information processing apparatus is notified of this purport.

Figure 3:
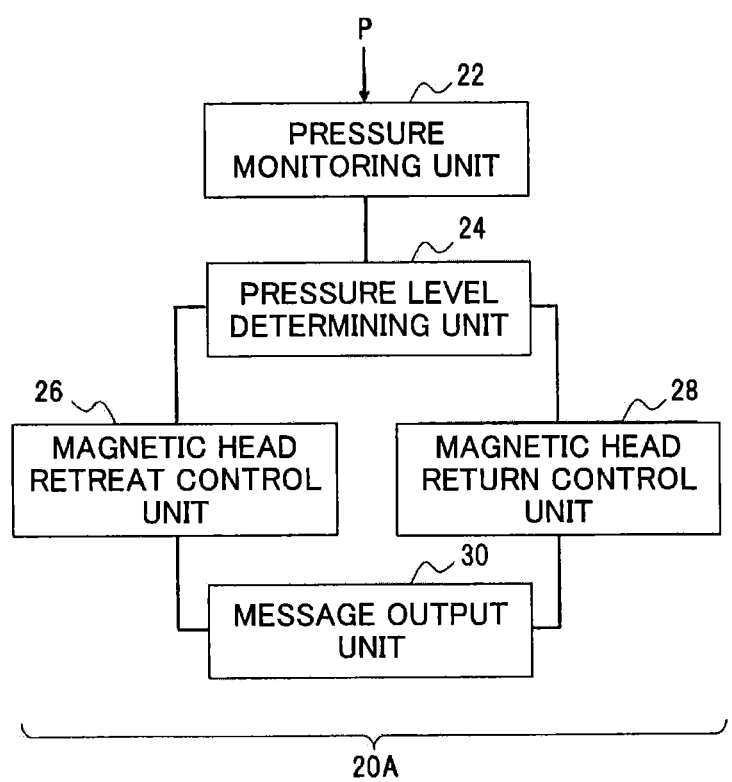
FIG. 3 is a diagram illustrating one example of function units of a personal computer according to a second embodiment.

The reference to FIG. 3 will be made with respect to the second embodiment. FIG. 3 is a diagram illustrating one example of function units of a personal computer according to the second embodiment. An illustrated configuration is one example, and the present invention is not limited to such a configuration.

A personal computer (PC) 20A is one example of the information processing apparatus, the protection method thereof and the protection program thereof of the present disclosure, in which a retreat process of the magnetic head 14 provided in the DD unit 6 is executed based on the detected pressure. The PC 20A includes, as protection function units of the DD unit 6, e.g., a pressure monitoring unit 22, a pressure level determining unit 24, a magnetic head retreat control unit 26, a magnetic head return control unit 28 and a message output unit 30. These function units are realized by the computer.

The pressure monitoring unit 22 is one example of a means to monitor continuously or intermittently the pressure caused by the external force applied to the information processing apparatus or the magnetic disk drive, and has a construction including a pressure sensor etc. The pressure sensor, which may involve utilizing, e.g., a diaphragm etc., is installed between a housing (an internal housing unit 68 (FIG. 7)) of the PC 20A and the DD unit 6, and detects and monitors a pressure P from the outside. This monitor output is transferred to the pressure level determining unit 24.

It is to be noted that the pressure monitoring unit 22 may involve making use of, e.g., a pressing sensor and a pressure sensitive sensor in addition to the pressure sensor.

The pressure level determining unit 24 is one example of a means to determine whether or not the detected pressure P is equal to or larger than the predetermined level. In this pressure level determination, it is determined based on a monitoring result of the pressure monitoring unit 22 whether or not the pressure P applied to the housing (the internal housing unit 68 (FIG. 7)) is equal to or larger than the predetermined threshold value. The threshold value may be determined by comparing a period of time till reaching a pressure large enough to break the DD unit 6 through pressurization with a period of time till the magnetic head 14 is retreated since the pressure has been detected.

Then, during the use of the DD unit 6, if the detected pressure P is determined to be equal to or larger than the threshold value, the magnetic head retreat control unit 26 is notified of a result of this determination.

Moreover, for example, when the retreat process of the magnetic head 14 is already underway and if the detected pressure P becomes equal to or smaller than the threshold value, the magnetic head return control unit 28 is notified of a result of this determination. Namely, the pressure monitoring unit 22 repeatedly detects the pressure, and the pressure level determining unit 24 repeatedly makes the determination by using the threshold value.

The magnetic head retreat control unit 26 is one example of a means to output a retreat control instruction of the magnetic head 14 to the DD unit 6. The pressure level determining unit 24 gives the notification of the determination result saying that the detected pressure is equal to or larger than the threshold value, in which case the DD unit 6 is controlled to retreat the magnetic head 14 to the retreat area 18.

The magnetic head return control unit 28 is one example of a means to output a return control instruction of the magnetic head 14 to the DD unit 6. To be specific, in the case of executing the process of retreating the magnetic head 14, if the detection result of the pressure monitoring unit 22 becomes equal to or smaller than the threshold value, the DD unit 6 is reset to a usable status by returning the magnetic head 14 to the position of the magnetic disk 12.

Figure 4:
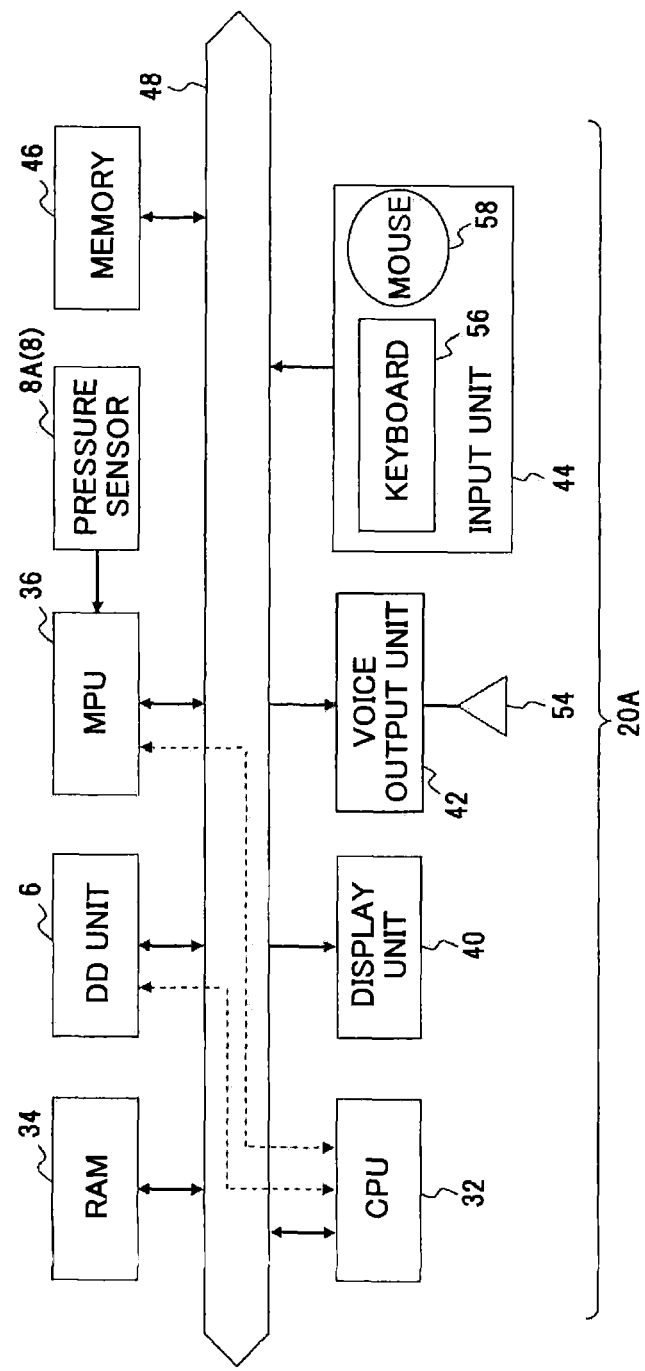
FIG. 4 is a diagram depicting one example of hardware of the personal computer.

The message output unit 30 is one example of a means to notify the user that the execution of the protection process of the DD unit 6 is underway, etc. This notification involves, e.g., outputting a message purporting that the retreat process of the magnetic head 14 is underway by use of a display unit 40 (FIG. 4) of the PC 20A. For others, for instance, an alarm that the pressure is being applied to the DD unit 6 is given by outputting an alarm sound by using a speaker 54 (FIG. 4). Further, in the return process, a message representing the return of the magnetic head 14 may also be output.

Figure 5:
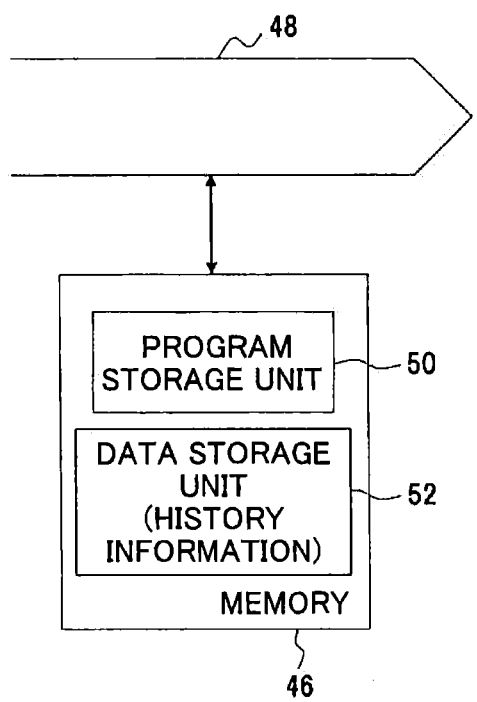
FIG. 5 is a diagram illustrating an example of a configuration of a memory.

Next, the reference to FIGS. 4 and 5 will be made with respect to a configuration of the PC 20A. FIG. 4 is a diagram depicting an example of a hardware configuration of the PC, and FIG. 5 is a diagram illustrating an example of a configuration of the memory. Note that each of the configurations illustrated in FIGS. 4 and 5 is one example, and the embodiment is not limited to these configurations.

The PC 20A includes, e.g., the DD unit 6, a pressure sensor 8A, a CPU (Central Processing Unit) 32, a RAM (Random Access Memory) 34, an MPU (Micro Processor Unit) 36 and a memory 46, which are connected to each other via a bus 48. The PC 20A further includes, e.g., the display unit 40, a voice output unit 42, an input unit 44, etc.

The DD unit 6 is, as already stated above, one example of the storage medium or the recording medium including inside at least the magnetic disk 12 and the magnetic head 14. Then, there are configured, for example, a program storage unit or a data storage unit that gets stored with a variety of programs such as OS (Operating System), firmware, application programs, etc. enabling the PC 20A to function.

The pressure sensor 8A is one example of a pressure measuring means and builds up the pressure monitoring unit 22 described above, in which the MPU 36 is notified of, e.g., a measured pressure value as carried on analog signals. This measurement may be always conducted during the boot-up of the PC 20A and the start-up of the DD unit 6 or may be performed at every predetermined timing.

The CPU 32 is one example of an computing means to execute, by computing, the OS and other processing programs stored on the DID unit 6 etc., and builds up the control unit 10 of the information processing apparatus 2 described above. Then, for instance, an operation control program etc. for the DID unit 6 is executed, thereby outputting the retreat control instruction and the return control instruction of the magnetic head 14.

The RAM 34 builds up a working area used for the control program etc. to be executed. Then, the CPU 32 executes the control program, whereby the magnetic head retreat control unit 26, the magnetic head return control unit 28, the message output unit 30, etc. are made to function.

The MPU 36 is a processor which executes the operation control program stored on the memory 46, and configures, e.g., the control unit 10 (FIG. 1), the pressure monitoring unit 22 and the pressure level determining unit 24. Then, the MPU 36 generates a command for retreating the magnetic head 14 (FIG. 1) if the detected pressure exceeds the predetermined level, and generates a command for returning the magnetic head 14 if the detected pressure decreases under the predetermined level. Subsequently, the MPU 36 notifies the CPU 32 of the generated commands, thereby performing the retreat control and the return control of the magnetic head 14.

Furthermore, the MPU 36 may configure the magnetic head retreat control unit 26, the magnetic head return control unit 28 and the message output unit 30. Namely, the MPU 36 may issue the commands of retreating or returning the magnetic head directly to the DD unit 6 and may also output the message output information to the display unit 40.

The memory 46 is constructed to include, e.g., a flash ROM (Read-Only Memory) and is, as depicted in FIG. 5, equipped with a program storage unit 50 and a data storage unit 52. The program storage unit 50 is stored with, e.g., the OS, the protection program and other processing programs, which are executed by the MPU 36. The data storage unit 52 configures, e.g., a history information storage unit and is stored with history information representing a retreat record, a return record, etc. of the magnetic head 14.

Note that the memory 46 may be built up to include an EEPROM (Electrically Erasable and Programmable Read Only Memory) of which contents are electrically rewritable.

Further, the processing programs described above are not limited to those stored on the program storage unit 50. For example, what is stored on a non-transitory computer-readable recording medium such as a magnetic disk, a flexible disk, an optical disk and a magneto-optic disk is also be available. Furthermore, the programs etc., which are read from servers, databases, etc. each existing on the network, are also available.

The display unit 40 is one example of the message output unit 30 described above, and has a configuration including, e.g., an LCD (Liquid Crystal Display) device etc. Then, the CPU 32 and the MPU 36 perform the display control under which the retreat message and the return message for the magnetic head 14 are displayed in characters and graphics on the screen in response to the message commands described above.

The voice output unit 42 is one example of the message output unit 30 and includes the speaker 54 etc. Then, the CPU 32 and the MPU 36 conduct the voice output control under which to output, e.g. an alarm sound as the retreat message of the magnetic head 14 and a return sound as the return message thereof.

The input unit 44, which is one example of a user interface, includes, e.g., a keyboard 56 and a mouse 58 and takes in an operation instruction given by a user's operation. The input unit 44 is, though not illustrated, configured to include a touch panel touched by the user to input the information, and the touch panel may be installed in the display unit 40.

Figure 6:
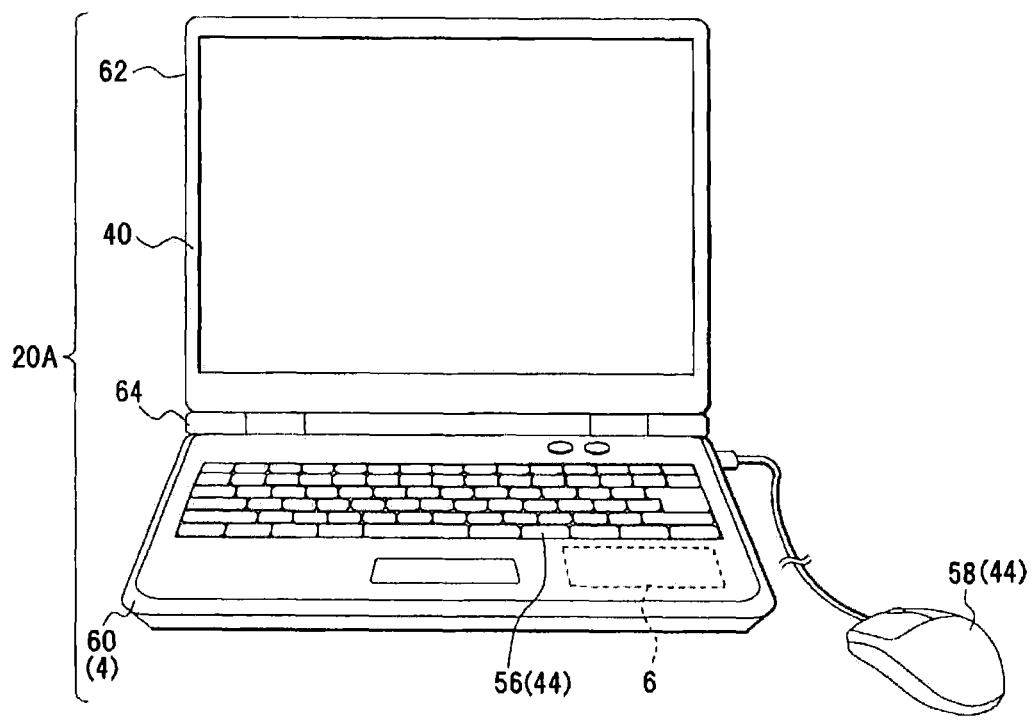
FIG. 6 is a view depicting an external appearance of the personal computer.
Figure 7:
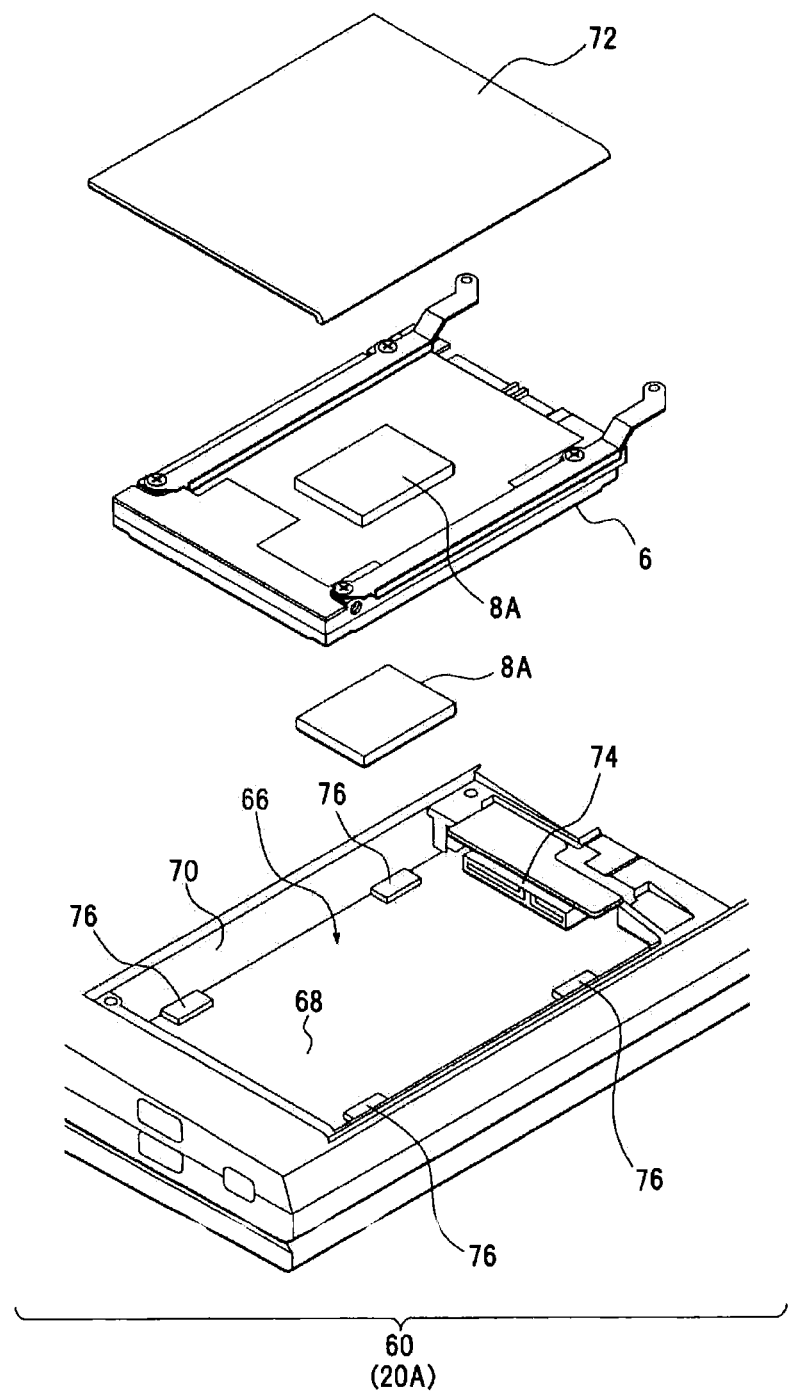
FIG. 7 is an exploded perspective view illustrating a portion of a magnetic disk drive unit of the personal computer.
Figure 8:
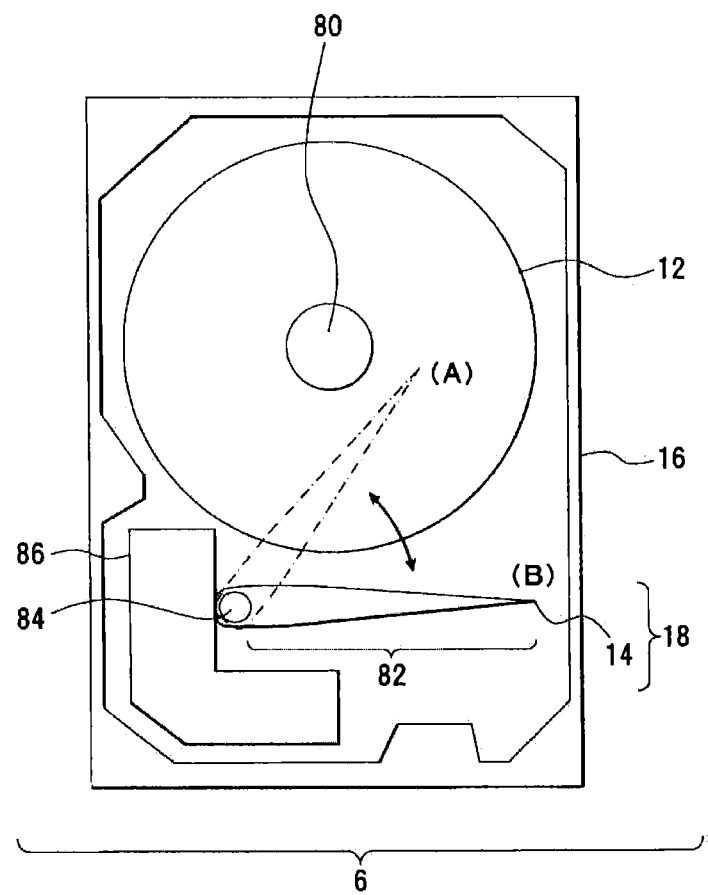
FIG. 8 is a view depicting the magnetic disk drive unit.
Figure 9:
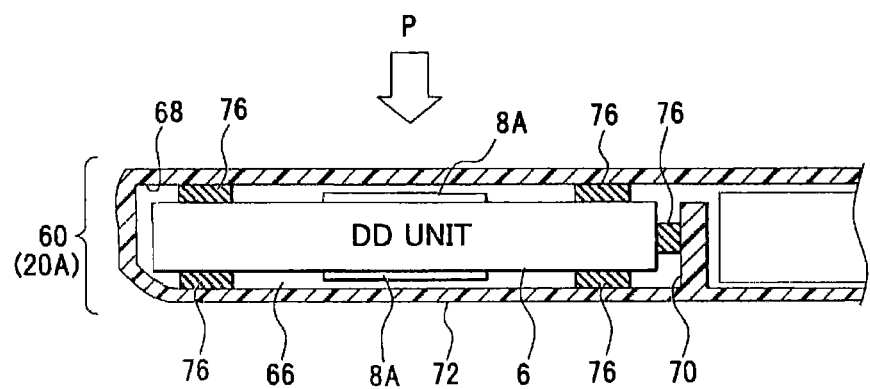
FIG. 9 is a sectional view illustrating the portion of the magnetic disk drive unit of the personal computer.
Figure 10:
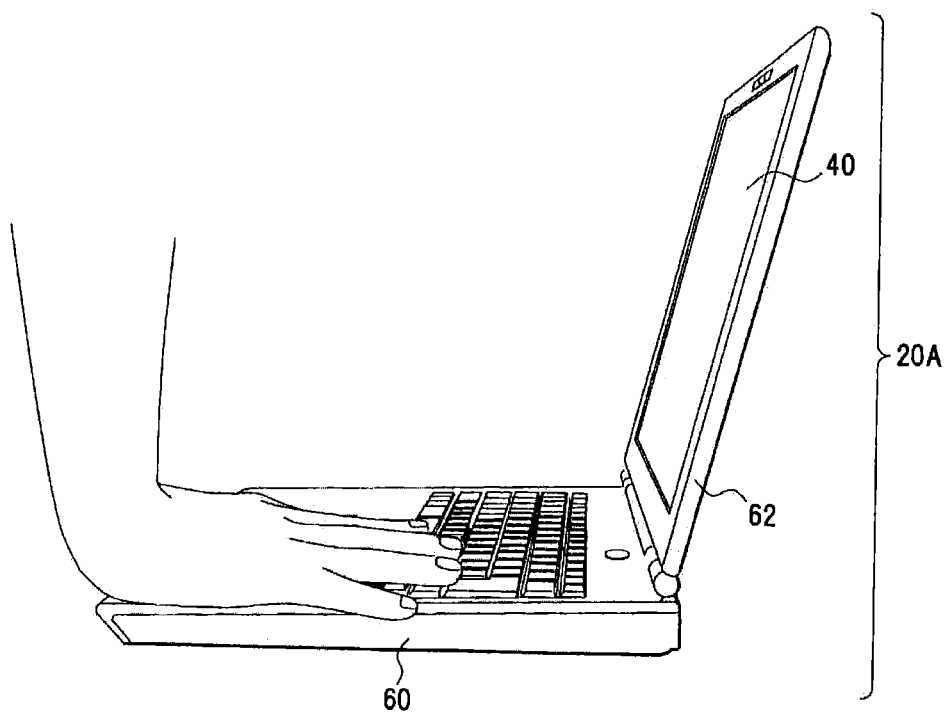
FIG. 10 is a view illustrating a state of how the portion of the magnetic disk drive unit of the personal computer is pressurized.
Figure 11:
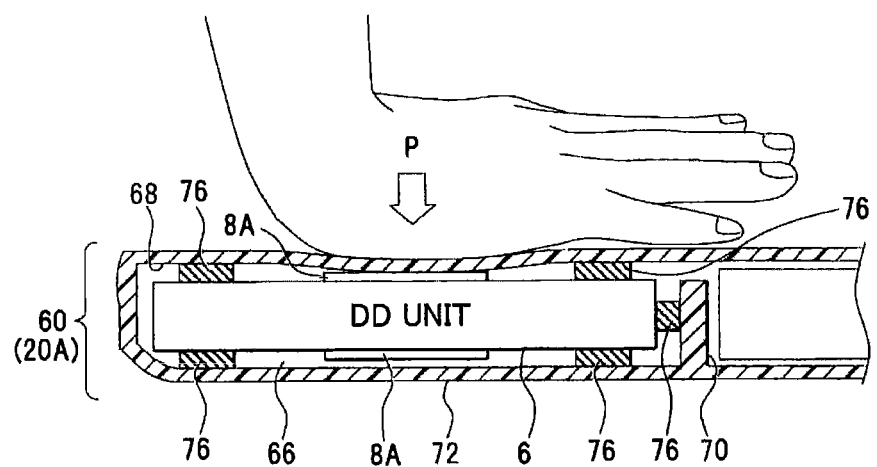
FIG. 11 is a view illustrating a section of the personal computer in the pressurized state.

Next, the reference to FIGS. 6, 7, 8, 9, 10 and 11 will be made with respect to the configurations of the PC 20A, the DD unit 6, the pressure sensor 8A, etc. FIG. 6 is a view depicting an external appearance of the PC as viewed from the front side; FIG. 7 is a view illustrating the DD unit mounted on the rear side of the PC; FIG. 8 is a view illustrating the DD unit; FIG. 9 is a sectional view illustrating the DD unit mounted on the PC; FIG. 10 is a view illustrating one example of a state of how the PC is pressurized; and FIG. 11 is a view depicting a section of the PC in the pressurized state.

The PC 20A is, as illustrated in FIG. 6, configured in an openable/closable manner by joining a keyboard side housing unit 60 to a display side housing unit 62 with a hinge member 64. The keyboard 56 is installed as the input unit 44 described above in the keyboard side housing unit 60, and the mouse 58 is connected to the keyboard side housing unit 60. The display unit 40 is installed in the display side housing unit 62. Then, the DD unit 6 is built in the interior of the keyboard side housing unit 60.

A containing unit 66 for receiving the self-contained DD unit 6 is, as depicted in FIG. 7, constructed in an interior of the bottom surface of the keyboard side housing unit 60, and a write face (FIG. 8) of the inside magnetic disk 12 of the DD unit 6 is inserted in parallel to the PC 20A. The containing unit 66 has a configuration including an internal housing unit 68 serving as the housing 4 described above, an external housing unit (cover unit) 72 and a vertical wall unit 70. The containing unit 66 is equipped with, e.g., a connector 74 for establishing a connection with the DD unit 6 and a buffer material 76, in which the DD unit 6 is mounted, for absorbing pressures and vibrations against the DD unit 6. The connector 74, for example, controls the power source and transmits the retreat instruction of the magnetic head 14 in addition to transferring and receiving the data to and from the DD unit 6 described above.

Then, in the containing unit 66, the pressure sensors 8A are installed between the internal housing unit 68 and the DD unit 6 and between the DD unit 6 and the external housing unit 72. With this arrangement, the pressure P received from the side of the upper portion or the bottom portion of the PC 20A is monitored.

The DD unit 6 is equipped with, for instance, as illustrated in FIG. 8, the single magnetic disk 12 or the plurality of magnetic disks 12 arranged so as to be multi-layered inside the housing unit 16. The magnetic disk 12 is so installed as to be rotatable by a driving motor 80 provided at the central portion thereof. Moreover, the DID unit 6 includes the magnetic head 14 for magnetically writing or reading the data to or from the magnetic disk 12. There may be provided the magnetic head(s) 14 of which the number corresponds to, e.g., the number of the magnetic disk(s) 12 installed therein.

For example, a swing arm 82, a rotary shaft 84 and a motor 86 are provided as means to move the magnetic head 14 to a predetermined position of the magnetic disk 12. The magnetic head 14 is provided at one end of the swing arm 82, while the other end of the swing arm 82 is fitted to the rotary shaft 84. Then, the magnetic head 14 is moved corresponding to a rotational quantity of the rotary shaft 84. The rotary shaft 84 is a means to move the swing arm 82 to right and left by the driving force given from the motor 86. The motor 86 is one example of a driving means for the rotary shaft 84. For example, a moving quantity of the swing arm 82 fitted to the rotary shaft 84 is controlled by regulating an amount of current carried to the motor 86.

When writing or reading the data, the magnetic head 14 is moved toward the magnetic disk 12 (status A). Further, when not writing or reading the data, the magnetic head 14 is moved to the retreat area 18 (status B). The retreat area 18 is a location where the magnetic head 14 is prevented from contacting the magnetic disk 12. Then, as stated above, in the case of detecting the pressure given from the outside and the distortion of the housing, the motor 86 is controlled to move the magnetic head 14 to this retreat area 18.

The DD unit 6 built in the PC 20A is, as depicted in FIG. 9, held by the buffer materials 76 installed in the internal housing unit 68 and the external housing unit 72 in the containing unit 66 of the keyboard side housing unit 60. Moreover, the side face of the DD unit 6 is held by the buffer material 76 installed between the vertical wall unit 70 and the DD unit 6 itself.

The buffer material 76, which has a composition including an elastic material such as a rubber, elastically holds and protects the DD unit 6 by buffering the pressure etc. given from the outside.

Further, the pressure sensors 8A are provided on the upper and lower portions of the DD unit 6, thereby monitoring the pressures P given from the outside.

The external force acting on the PC 20A is generated by weighting and pressing the keyboard side housing unit 60, e.g., as illustrated in FIG. 10, when the user stands up while placing the hand on the upper portion of the keyboard side housing unit 60, etc.

Then, in the keyboard side housing unit 60 receiving the external force, as depicted in FIG. 11, the internal housing unit 68 is pressed to cause the distortion. If the external force generated by weighting the housing unit down is small, the external force is buffered by the buffer materials 76 installed within the containing unit 66. If a large load is applied such as applying a user's body weight when the user stands up, however, the self-contained DD unit 6 undergoes the pressurized state.

In the containing unit 66, the pressure sensor 8A installed between the internal housing unit 68 and the DD unit 6 monitors the pressure P caused by the external force that cannot be absorbed by the buffer material 76.

Note that the external force is not limited to what is applied from the upper side of the keyboard side housing unit 60 but may be, e.g., a weight applied to the rear surface of the PC 20A, i.e., the external housing unit 72. That is, as depicted in FIGS. 7 and 8, the pressure sensor 8A monitors the pressure P acting on the side of the recording surface of the magnetic disk 12 provided in the DD unit 6. Then, the magnetic head 14 is retreated to the retreat area 18 on the basis of this monitoring result, thereby preventing the head-crash of the magnetic head 14 on the magnetic disk 12.

Figure 12:
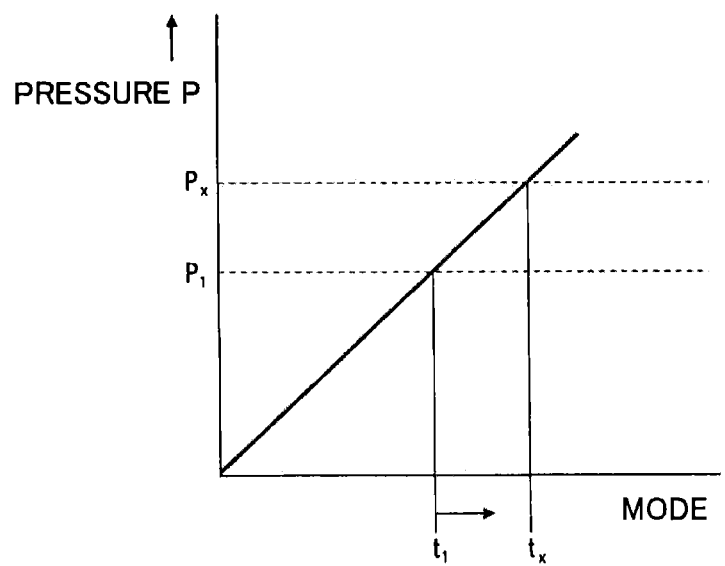
FIG. 12 is a diagram illustrating an operation control timing of the magnetic head versus a pressure value.

Next, the reference to FIG. 12 will be made with respect to a magnetic head retreat process timing versus the detected pressure value. FIG. 12 is a diagram illustrating the magnetic operation control timing versus the pressure value. Note that each of the detection result of the pressure depicted in FIG. 12, the processing content, etc. is one example, and the embodiment is not limited to this example.

The pressure P applied onto the PC 20A rises corresponding to, e.g., an elapse of the time. It takes a predetermined period of time to reach such a pressure $P_x$ that the DD unit 6 comes to break down due to the head-crash. Such being the case, let $t_x$ be a timing when the pressure against the DD unit 6 reaches $P_x$, and the retreat control may be done at a timing $t_1$ of reaching a threshold pressure $P_1$ which takes the retreat time of the magnetic head 14 into consideration. With this contrivance, the DD unit 6 enables the magnetic head 14 to be retreated before reaching the breakdown pressure $P_x$.

Figure 13:
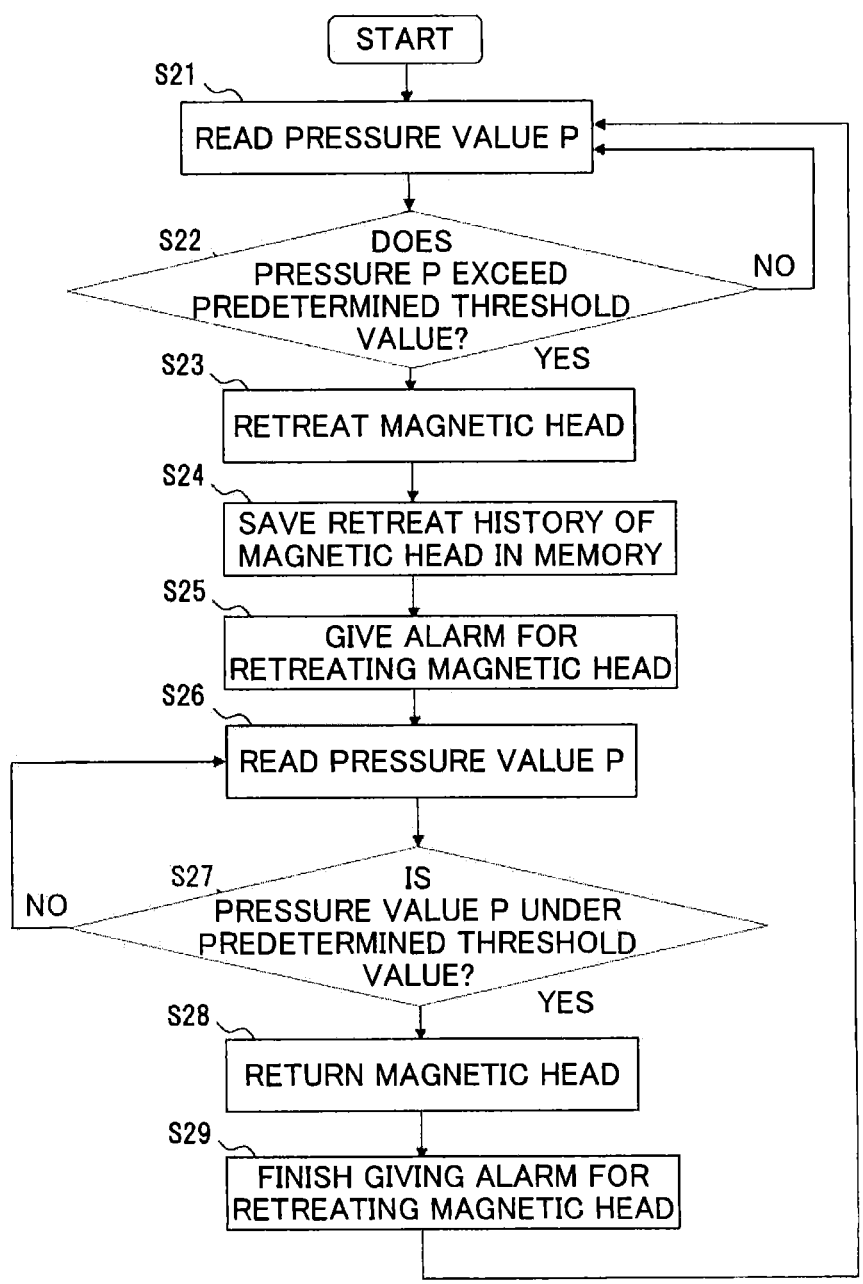
FIG. 13 is a flowchart illustrating a processing procedure of protecting the magnetic disk drive unit.

Next, the reference to FIG. 13 will be made with respect to a processing procedure of protecting the DD unit. FIG. 13 is a flowchart illustrating the processing procedure of protecting the DD unit. It is to be noted that each of the processing procedure, processing contents, etc. depicted in FIG. 13 is one example, and the embodiment is not limited to this example.

A process of monitoring the pressure against the DD unit 6 involves reading the pressure value P detected by the pressure sensor 8A (step S21). For example, the MPU 36 reads the pressure value P and determines whether or not this pressure value P exceeds a predetermined threshold value $P_1$ (step S22). The operation shifts to the retreat process of the magnetic head 14 (step S23) if the pressure value P exceeds the threshold value $P_1$ (YES in step S22), but the pressure monitoring process is continued again whereas if the pressure value P does not exceed the threshold value $P_1$ (NO in step S22).

In the retreat process of the magnetic head 14 (step S23), for instance, the driving motor 80 (FIG. 8) is operated to rotate the swing arm 82, thereby retreating the magnetic head 14 to the retreat area 18. At this time, a retreat history of the magnetic head 14 is stored on the data storage unit 52 of the memory 46 (step S24). Further, the alarm for retreating the magnetic head 14 is given (step S25). This alarm may involve displaying a purport of having done the retreat on the display screen by use of the display unit 40 of the PC 20A and emitting an alarm sound by use of the speaker 54, and may also involve both displaying on the screen and emitting the alarm sound.

The pressure continues being monitored also during the execution of the retreat process of the magnetic head 14, and the retreat process of the magnetic head 14 is canceled corresponding to the pressure state against the DD unit 6.

Then, the process of monitoring the pressure during the execution of the retreat process involves reading the pressure value P detected by the pressure sensor 8A (step S26), and determining whether or not this pressure value P decreases under the predetermined threshold value $P_1$ (step S27). If the pressure value P decreases under the threshold value $P_1$ (YES in step S27), the magnetic head 14 is returned (step S28), and the alarm for retreating the magnetic head 14 is stopped (step S29). Then, the operation loops back again to the pressure monitoring process (step S21). With the return of the magnetic head 14, the magnetic head 14 restarts writing to or reading from the DD unit 6 or is shifted to the standby status for the writing or reading instruction.

Further, whereas if the pressure value P does not decrease under the threshold value $P_1$ (NO in step S27), the pressure value P continues being monitored in the status of retreating the magnetic head 14.

Such processes can prevent the head-crash of the magnetic head 14 on the magnetic disk 12, whereby the magnetic head 14 and the magnetic disk 12 are protected.

Figure 14:
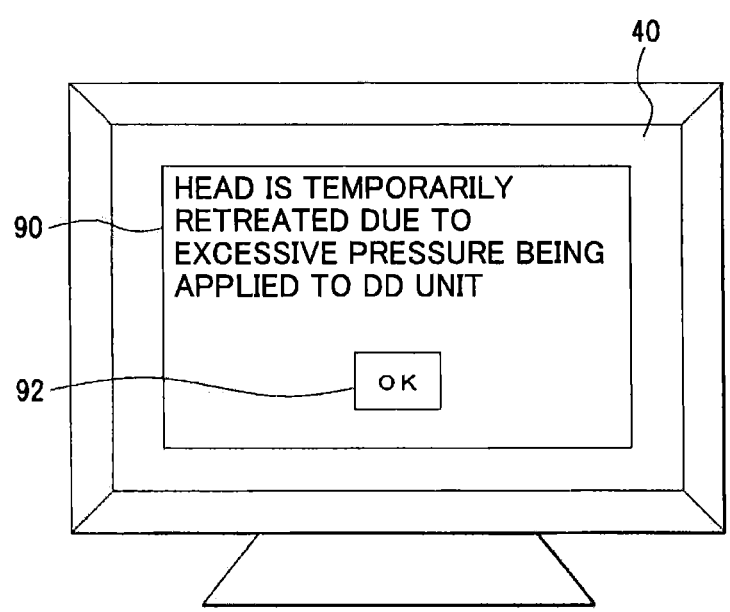
FIG. 14 is a view illustrating one example of displaying a message.

Next, the reference to FIG. 14 will be made with respect to alarm notification in the case of retreating the magnetic head 14. FIG. 14 is a diagram illustrating a display example of an alarm message.

In the case of retreating the magnetic head 14, e.g., an alarm screen 90 is displayed by way of the alarm thereof on the display unit 40 as depicted in FIG. 14. For example, a message such as "the head is temporarily retreated because of an excessive pressure being applied to the DD unit" may be displayed on the alarm screen 90. Further, a character "OK" is simultaneously displayed as a confirmation display icon 92 on this alarm screen 90. With this display arrangement, the alarm display and the alarm sound may be stopped by clicking the icon 92 by manipulating the mouse 58. Alternatively, if the display unit 40 is configured as a touch panel display, the user may contact (touch) the icon 92.

Figure 15:
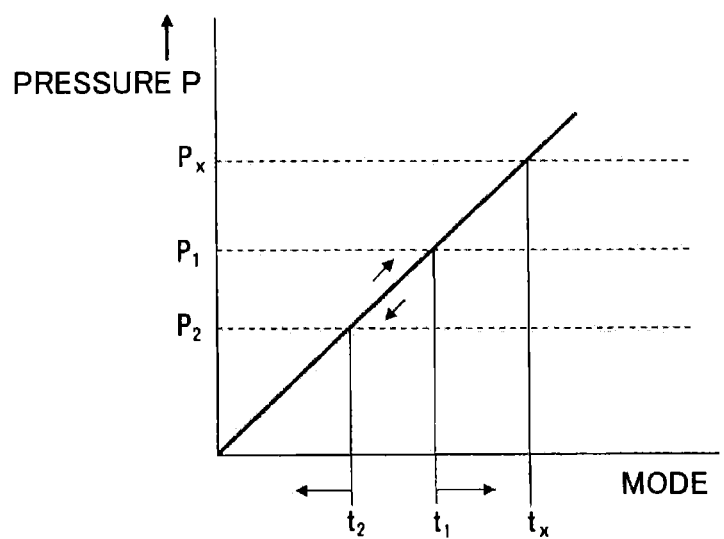
FIG. 15 is a diagram illustrating another operation control timing of the magnetic head versus the pressure value.
Figure 16:
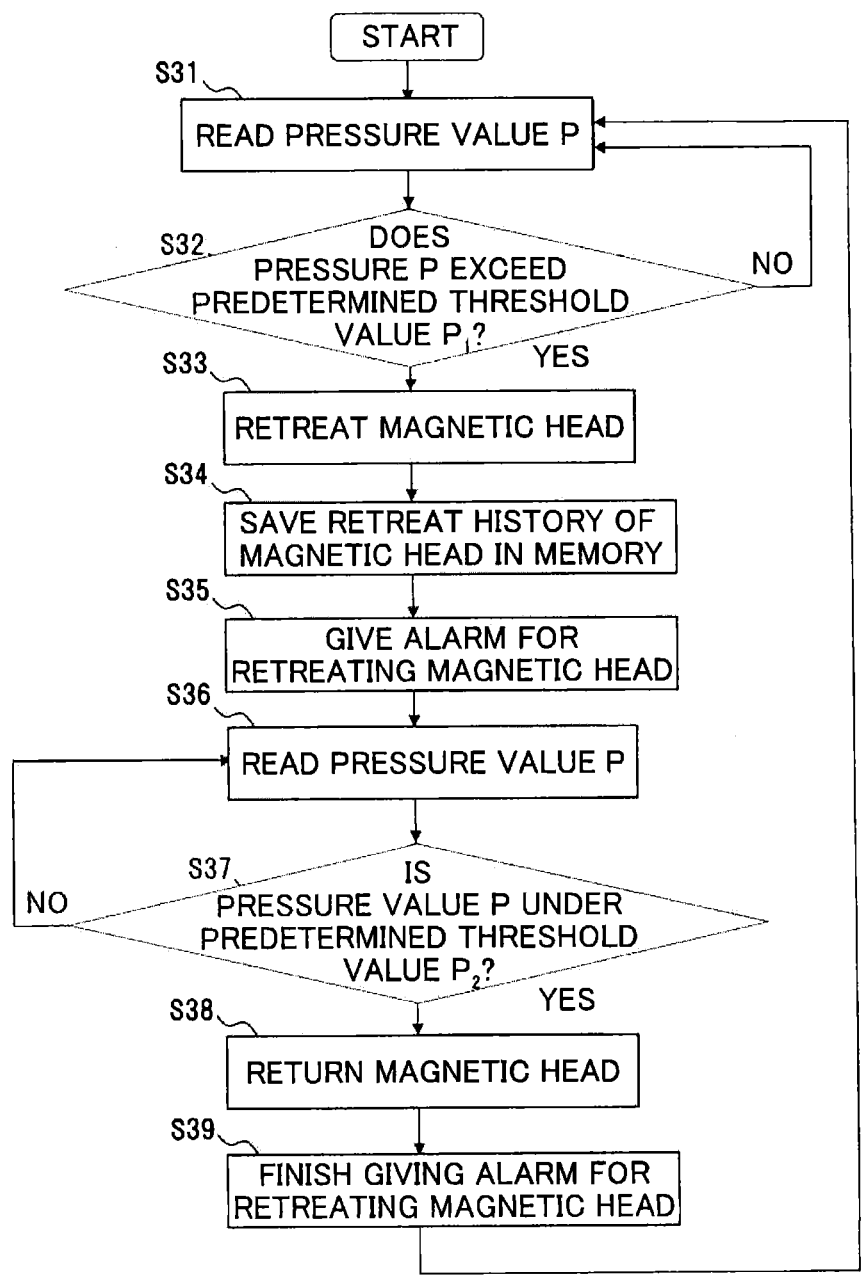
FIG. 16 is a flowchart illustrating another processing procedure of protecting the magnetic disk drive unit.

Next, the reference to FIGS. 15 and 16 will be made with respect to another example of the DD unit protection process. FIG. 15 is a diagram illustrating another operation control timing of the magnetic head versus the pressure value, and FIG. 16 is a flowchart illustrating another processing procedure of protecting the DD unit. Note that each of the processing contents, the processing procedure, etc. depicted in FIGS. 15 and 16 is one example, and the embodiment is not limited to this example.

In this example of the protection process, a plurality of different threshold values is set for the detected pressure values P. For instance, as described above, a threshold value $P_2$ for returning the magnetic head 14 is set in addition to the threshold value $P_1$ for retreating the magnetic head 14. For instance, a value lower than the threshold value $P_1$ is set as the threshold value $P_2$. Namely, a hysteresis is given to between the threshold value $P_1$ for retreating the magnetic head 14 and the threshold value $P_2$ for the returning the magnetic head 14.

In a specific process, e.g., as illustrated in FIG. 15, the retreat process of the magnetic head 14 is started at the timing $t_1$ when reaching the threshold value $P_1$ in a rising status of the pressure P. Moreover, the pressure P comes to the decreasing status already in the retreat status of the magnetic head 14, and the start of the return process of the magnetic head 14 is triggered by a timing $t_2$ when the detected pressure value reduces down to the threshold value $P_2$.

Through this process, even when a temporary change of the pressure occurs in the vicinities of the threshold values $P_1$, $P_2$, the retreat process or the return process is maintained, and safety is more enhanced. Namely, even when the pressure value P received by the DD unit 6 is in the course of ascent and temporarily decreases under the threshold value $P_1$ after exceeding the threshold value $P_1$ and unless reaching the threshold value $P_2$, the retreat process of the magnetic head 14 continues. Further, even when the pressure value P is in the course of descent and temporarily exceeds the threshold value $P_2$ after decreasing under the threshold value $P_2$ and unless reaching the threshold value $P_1$, the return process of the magnetic head 14 is maintained.

Next, in the processing examples of the retreat process and the return process of the magnetic head 14, the pressure monitoring process involves, as illustrated in FIG. 16, reading the pressure value P measured by the pressure sensor 8A (step S31). Then, it is determined whether the pressure value P exceeds the threshold value $P_1$ or not (step S32), and, if over $P_1$ (YES in step S32), the magnetic head 14 is retreated (step S33). Whereas if not over (NO in step S32), the monitoring process continues.

Furthermore, the return process in the case of already retreating the magnetic head 14 involves reading the measured pressure value P (step S36), and determining whether or not the pressure value P decreases under the threshold value $P_2$ (step S37). Then, if the measured pressure value P is under the threshold value $P_2$ (YES in step S37), the magnetic head 14 is returned (step S38).

Note that the recording process of the retreat history of the magnetic head 14 (step S34), the alarm process for retreating the magnetic head 14 (step S35) and the finishing process of the alarm for retreating the magnetic head 14 (step S39) may be executed in the same way as the processes (steps S24, S25, S29) illustrated in FIG. 13, and the descriptions thereof are omitted.

According to such a configuration, the magnetic head can be retreated before causing the head-crash of the magnetic head on the magnetic disk due to the external force applied to the information processing apparatus. Moreover, the pressure value can be used to its limits by setting one or a plurality of thresholds values taking account of the retreat time of the magnetic head and the pressure value etc. with which the head-crash is caused, thereby enhancing the convenience.

Characteristic items, advantages or modified examples of the second embodiment will be enumerated.

(1) The information processing apparatus 2 is configured, e.g., such that the pressure sensor 8A is installed at a mounting portion of the DD unit 6 within a housing of a mobile terminal apparatus, and a vibration absorbing component (e.g., the buffer material 76) for absorbing the vibrations is provided in the periphery of the pressure sensor 8A. Then, when the pressure sensor 8A detects a pressure equal to or larger than a fixed level at the mounting portion of the magnetic disk 12, the head-crash in the DD unit 6 can be prevented by automatically retreating the magnetic head 14.

(2) The information processing apparatus 2 is configured, e.g., in such a way that the pressure sensor 8A is installed at the mounting portion of the DD unit 6 of the mobile terminal apparatus, and the DID unit 6 is protected by retreating the magnetic head 14 when pressurized. This contrivance enables the magnetic disk 12 to be protected without requiring any rigid protection structure. Namely, the structure peripheral to the magnetic disk 12 can be thinned and reduced in weight, thereby making it possible to contribute to downsize, e.g., the mobile terminal apparatus.

(3) Additionally, if the pressure sensor 8A detects the pressure equal to or larger than the fixed level, the message (the alarm screen 90: FIG. 14) is output such as displaying the alarm, emitting the alarm sound, etc.

(4) It takes several seconds to reach the pressure by which the DID unit 6 comes to the breakdown, while the retreat of the magnetic head 14 takes a time in unit of, e.g., 100 [ms] since the pressure has been detected. The breakdown of the DID unit 6 can be prevented by setting a proper threshold value so that the magnetic head 14 is able to be retreated before the DD unit 6 comes to the breakdown.

(5) Further, the plurality of threshold values is set, the magnetic head 14 is retreated at a point of time when the pressure rises to the threshold value $P_1$, and thereafter the retreat of the magnetic head 14 is canceled at a point of time when the pressure decreases down to the threshold value $P_2$, thereby having the hysteresis and enabling the safety operation to be performed.

(6) Even in the case of mounting the DID unit 6 in, e.g., the PC 20A as the information processing apparatus, the housing itself can be reduced in wall thickness, and the buffer material 76 can be built up with the minimum required configuration, thereby enabling the structure of the mounting portion of the DD unit 6 to be more simplified and the PC 20A to be downsized.

Third Embodiment

A third embodiment is that the distortion of the housing, which is caused by the force received from the outside, is detected, and the protection process of the DD unit 6 is executed based on this distortion.

Figure 17:
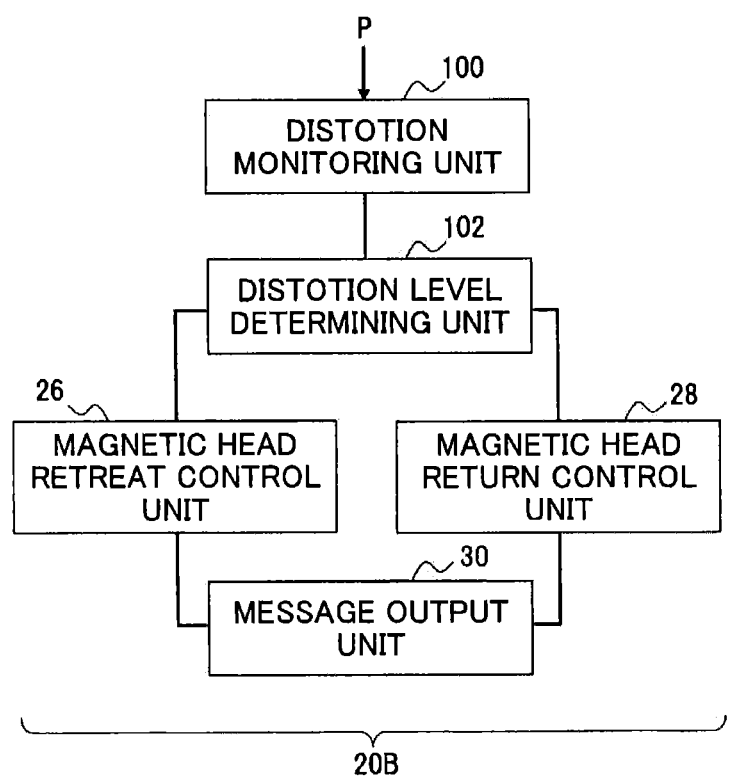
FIG. 17 is a diagram illustrating one example of the function units of the personal computer according to a third embodiment.
Figure 18:
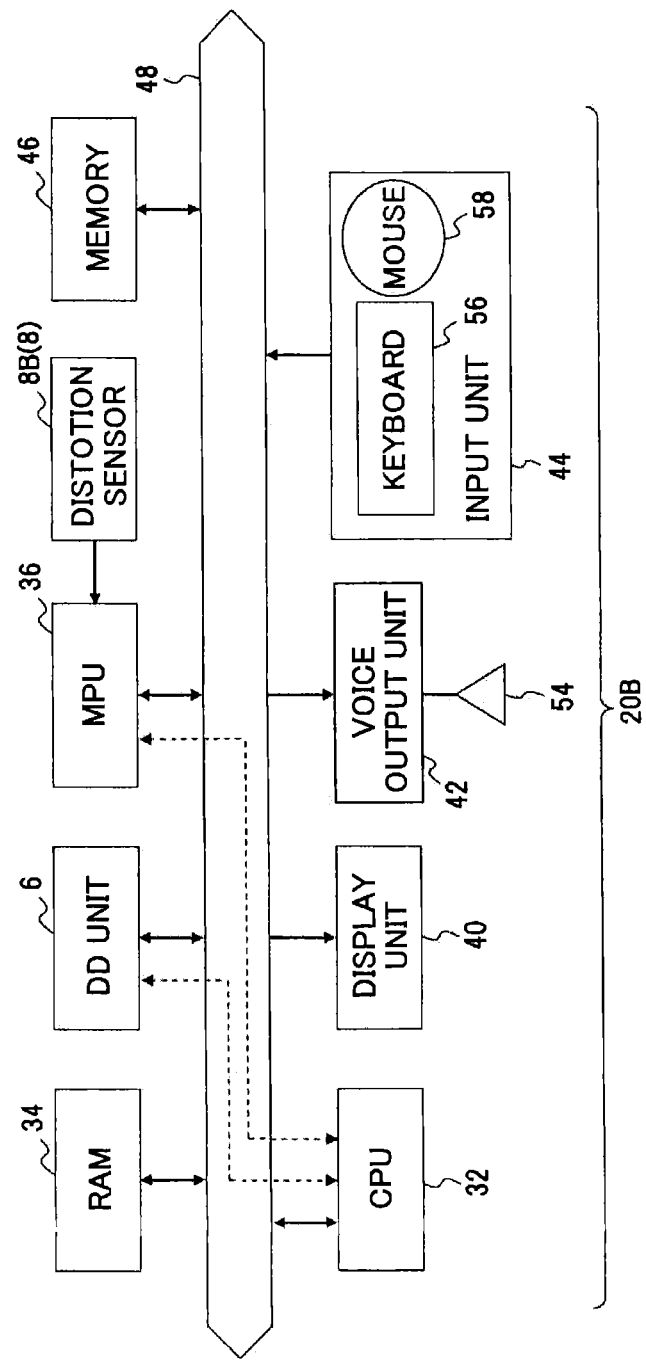
FIG. 18 is a diagram depicting an example of the hardware configuration of the personal computer.

The reference to FIGS. 17 and 18 will be made with respect to the third embodiment. FIG. 17 is a diagram illustrating one example of function units of the PC according to the third embodiment, and FIG. 18 is a diagram illustrating an example of a hardware configuration of the PC. Note that each of the configurations depicted in FIGS. 17 and 18 is one example, and the embodiment is not limited to this example. The same portions in FIGS. 17 and 18 as those in FIGS. 3 and 4 are marked with the same numerals and symbols, and the descriptions thereof are omitted.

A PC 20B is one example of the information processing apparatus, the protection method thereof and the protection program thereof of the present disclosure, in which the housing distortion caused by the external force applied to the PC 20B is detected, and the magnetic head is protected corresponding to a detected value thereof. The PC 20B has a configuration including, e.g., a distortion monitoring unit 100, a distortion level determining unit 102, etc. in addition to the magnetic head retreat control unit 26, the magnetic head return control unit 28 and the message output unit 30, which are described above. These function units may be configured by the computer.

The distortion monitoring unit 100 is one example of a means to continuously or intermittently measure and monitor the distortion of the housing 4, which is caused by the external force P applied to the PC 20B, and is configured by including, e.g., a distortion sensor etc. A monitor output is transferred the distortion level determining unit 102

The distortion level determining unit 102 is one example of a means to determine whether or not the measured distortion of the housing 4 reaches a predetermined level. The distortion level determination involves determining based on, e.g., a measurement result of the distortion monitoring unit 100 whether or not the distortion is equal to or larger than a threshold value. This threshold value may be set by comparing, e.g., a period of time till reaching such a distortion state that the DD unit 6 comes to the breakdown due to the external force with a period of time till the magnetic head 14 is retreated. Then, the magnetic head retreat control unit 26 or the magnetic head return control unit 28 is notified of the determination result.

The reference to FIG. 18 will be made with respect to the hardware configuration of the PC 20B.

The PC 20B includes, e.g., a distortion sensor 8B, etc. in addition to, as described above, the DD unit 6, the CPU 32, the RAM 34, the MPU 36, the display unit 40, the voice output unit 42, the input unit 44, the memory 46 and the bus 48.

The distortion sensor 8B is one example of a means to measure the distortion of the housing of the PC 20B, and builds up the distortion monitoring unit 100 described above. For instance, a distortion gauge etc. may be used as the distortion sensor 8B. The MPU 36 is notified of the measured distortion information of the housing as carried on, e.g., the analog signals. The distortion may be measured always in the same way as in the case of the pressure or may be measured at an interval of the predetermined timing.

The MPU 36 is configured to include, e.g., the distortion monitoring unit 100 and the distortion level determining unit 102 that are described above, and makes the determination about the distortion with the aid of the measurement result of which the distortion sensor 8B has notified by executing the protection program existing in the memory 46. Subsequently, the instruction of retreating the magnetic head 14 is output to the DD unit 6 via the CPU 32 on the basis of the determination result.

Figure 19:
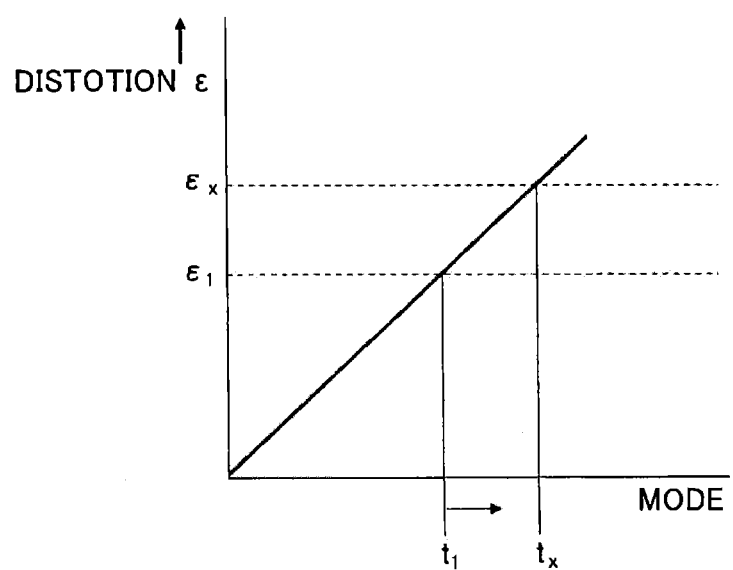
FIG. 19 is a diagram illustrating an operation control timing of the magnetic head versus a distortion value.
Figure 20:
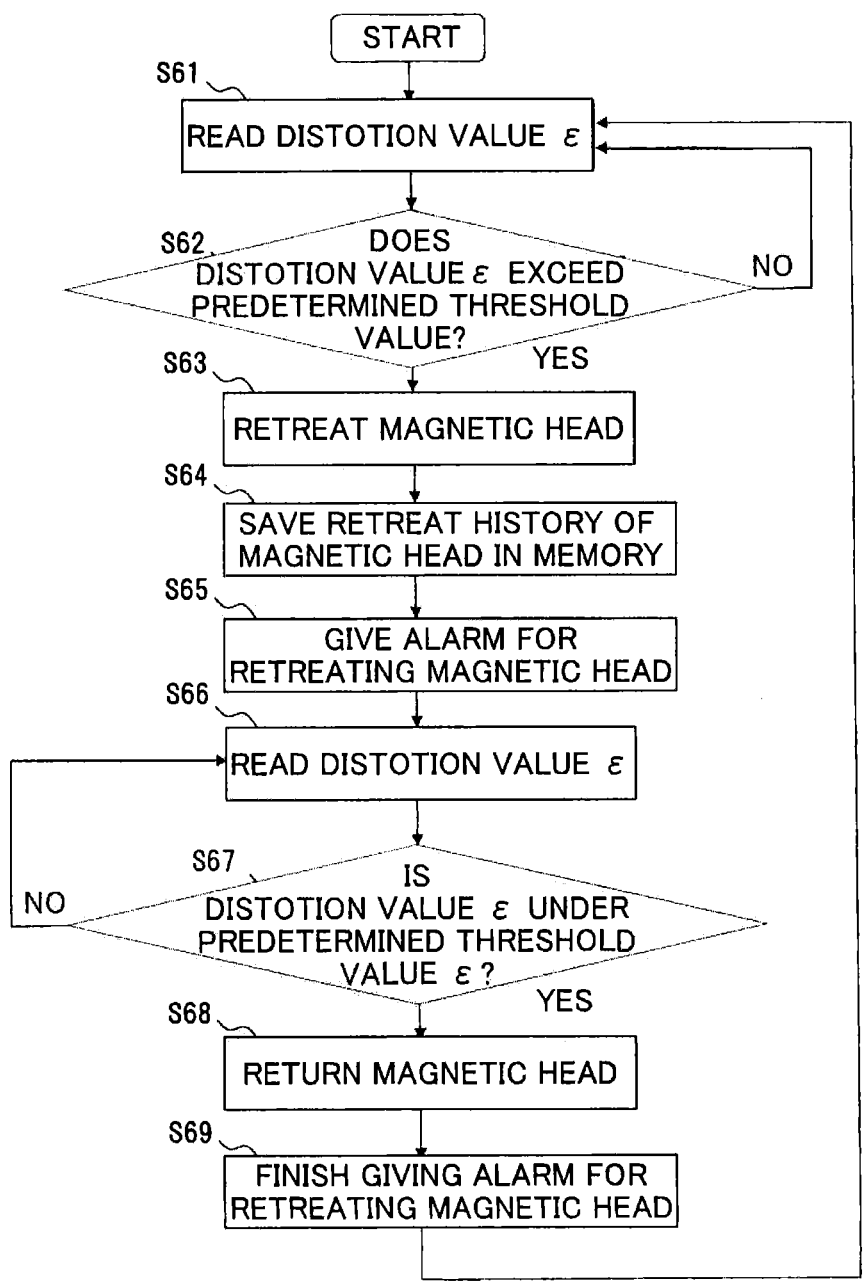
FIG. 20 is a flowchart illustrating the processing procedure of protecting the magnetic disk drive unit.

Next, the reference to FIGS. 19 and 20 will be made with respect to the process of protecting the DD unit. FIG. 19 is a diagram illustrating an operation control timing of the magnetic head versus the distortion value, and FIG. 20 is a flowchart illustrating a processing procedure for protecting the DD unit. Note that each of the measurement result depicted in FIG. 19 and the processing procedure illustrated in FIG. 20 is one example, and the embodiment is not limited to this example.

A distortion value $\epsilon$ of the housing of the PC 20B increases corresponding to, e.g., as illustrated in FIG. 19, an elapse of the time. Such being the case, let $t_x$ be a timing when reaching such a distortion value $\epsilon_x$ that the DD unit 6 comes to the breakdown caused by the head-crash, and the retreat control may be conducted at the timing $t_1$ when becoming a threshold value $\epsilon_1$ taking account of the retreat time of the magnetic head 14.

Then, the reference to FIG. 20 will be made with respect to the magnetic head retreat control based on the distortion value $\epsilon$.

The distortion value $\epsilon$ detected by the distortion sensor 8B is read by the MPU 36 (step S61). It is determined whether or not the distortion value $\epsilon$ of the distortion sensor 8B exceeds the predetermined threshold value $\epsilon_1$ (step S62). Then, if the distortion value $\epsilon$ does not exceed the threshold value $\epsilon_1$ (NO in step S62), the distortion value $\epsilon$ continues to be monitored.

Whereas if the distortion value $\epsilon$ exceeds the threshold value $\epsilon_1$ (YES in step S62), the magnetic head 14 of the DD unit 6 is retreated to the retreat area 18 (step S63), and the retreat history of the magnetic head 14 is stored in the data storage unit 52 of the memory 46 (step S64). Further, the notification of the alarm for retreating the magnetic head 14 is given by way of displaying on the screen or emitting the alarm sound (step S65). This alarm notification may involve performing both displaying on the screen and emitting the alarm sound.

In the case of executing the retreat process of the magnetic head 14, the distortion value $\epsilon$ detected by the distortion sensor 8B is read by way of monitoring the cancellation of the distortion (step S66), and it is determined whether the distortion value $\epsilon$ decreases under the threshold value $\epsilon_1$ or not (step S67). If the distortion value $\epsilon$ does not decrease under the threshold value $\epsilon_1$ (NO in step S67), the distortion value $\epsilon$ continues to be monitored.

Whereas if the distortion value decreases under the threshold value $\epsilon_1$ (YES in step S67), the magnetic head 14 of the DD unit 6 is returned (step S68). Further, the display of the alarm for retreating the magnetic head 14 is erased, or the alarm sound is stopped, or alternatively both of these operations are done (step S69).

In such a process, for instance, the distortion value is continuously monitored during the working of the PC 20B. With this continuous monitoring, the head-crash of the magnetic head 14 on the magnetic disk 12 can be prevented, thereby protecting the magnetic head 14 and the magnetic disk 12.

Figure 21:
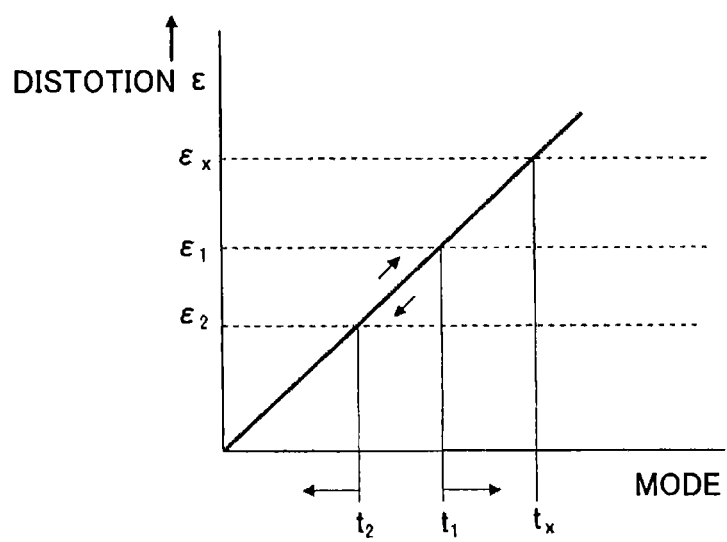
FIG. 21 is a diagram illustrating another operation control timing of the magnetic head versus the distortion value.

Next, the reference to FIG. 21 will be made with respect to another example of the protection process of the DD unit. FIG. 21 is a diagram illustrating another operation control timing of the magnetic head versus the detected distortion. Note that the detection result illustrated in FIG. 21 is one example, and the embodiment is not limited to this example.

In this protection process, there is given a case of setting a plurality of difference threshold values in relation to the protection process of the DD unit 6 on the basis of the detected distortion. That is, a threshold value $\epsilon_2$ for returning the magnetic head 14 is set in relation to the threshold value $\epsilon_1$ for retreating the magnetic head 14. The threshold value $\epsilon_2$ is set lower than, e.g., the threshold value $\epsilon_1$, and, in the same way as in the case of the pressure described above, the hysteresis is given to between the threshold value $\epsilon_1$ for retreating the magnetic head 14 and the threshold value $\epsilon_2$ for returning the magnetic head 14.

Then, in an ascending status of the detection distortion $\epsilon$, the magnetic head 14 is retreated at the timing $t_1$ when reaching the threshold value $\epsilon_1$, and, when the distortion value $\epsilon$ comes to a descending status, the magnetic head 14 is returned as triggered by the timing $t_2$ when decreasing down to the threshold value $\epsilon_2$.

The reading process of the detected distortion value, the retreat process of the magnetic head 14, the retreat alarm, the return process of the magnetic head 14, etc. may be executed similarly to the processes illustrated in FIG. 16, and their descriptions are omitted.

Through these processes, for example, even when the distortion temporarily changes in the vicinities of the threshold values $\epsilon_1$ and $\epsilon_2$, the retreat process and the return process are maintained, whereby the safety is more enhanced.

According to such a configuration, as described above, the magnetic head can be retreated before causing the head-crash of the magnetic head on the magnetic disk by detecting the distortion which occurs in the information processing apparatus.

Fourth Embodiment

A fourth embodiment exemplifies a case of detecting a value of the pressure applied to the information processing apparatus and a value of the distortion caused in the housing thereof and, if these detected values reach predetermined levels, executing the retreat process of the magnetic head 14.

Figure 22:
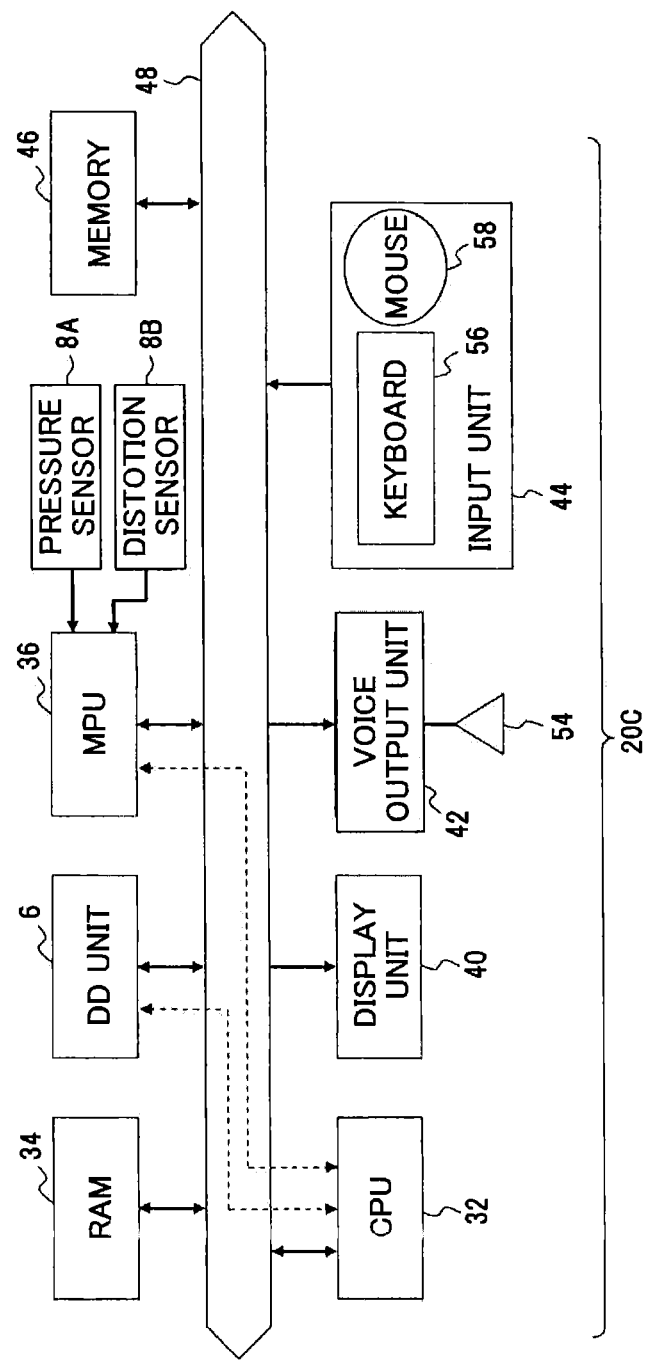
FIG. 22 is a diagram depicting an example of the hardware configuration of the personal computer according to a fourth embodiment.
Figure 23:
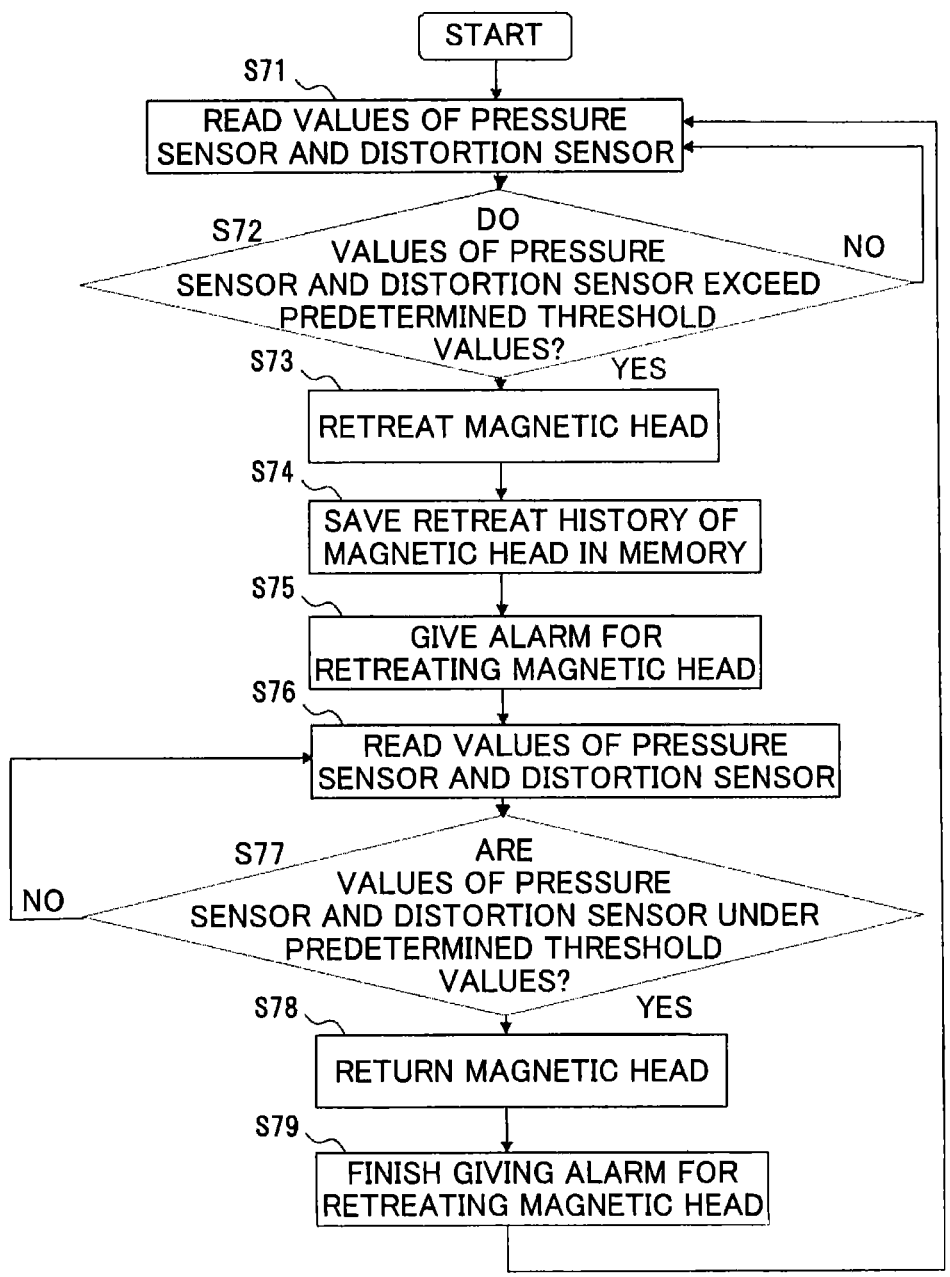
FIG. 23 is a flowchart illustrating the processing procedure of protecting the magnetic disk drive unit.

The reference to FIGS. 22 and 23 will be made with respect to the fourth embodiment. FIG. 22 is a diagram illustrating a hardware configuration of the PC according to the fourth embodiment, and FIG. 23 is a flowchart illustrating a processing procedure of protecting the DD unit. Note that each of the configuration, the processing content and the processing procedure depicted in FIGS. 22 and 23 is one example, and the embodiment is not limited to this example. The same portions in FIG. 22 as those in FIGS. 4 and 18 are marked with the same numerals and symbols.

A PC 20C is one example of the information processing apparatus, the protection method and the protection program of the present disclosure, in which the pressure P applied to the PC 20C and the distortion c caused in the housing are detected, and the retreat process of the magnetic head 14 is executed corresponding to the detected values thereof. Such being the case, the PC 20C includes, as depicted in FIG. 22, the pressure sensor 8A and the distortion sensor 8B each described above.

In this DD unit protection process, as illustrated in FIG. 23, the magnetic head is retreated when the detected pressure value and/or distortion value exceed(s) the predetermined threshold value(s), and the retreat of the magnetic head is canceled when under the threshold value(s).

Then, the monitoring process involves reading the pressure value P and the distortion value $\epsilon$, which are measured by the pressure sensor 8A and the distortion sensor 8B (step S71). Subsequently, it is determined whether the pressure value P and/or the distortion value $\epsilon$ exceed(s) the predetermined threshold value(s) or not (step S72). If over the threshold value(s) (YES in step S72), the retreat process of the magnetic head 14 is carried out (step S73). Whereas if not over the threshold value(s) (NO in step S72), the monitoring process continues.

Further, the monitoring process continues also during the execution of the retreat process, and, if the detected value(s) of the pressure sensor 8A and/or the distortion sensor 8B decrease(s) under the predetermined threshold value(s) (YES in step S77), the magnetic head 14 is returned (step S78).

Note that the history storage process, the retreat alarm process, etc., may be executed in this process similarly to the embodiment (e.g., FIG. 13) discussed above, and their descriptions are omitted.

Herein, the threshold values $P_1$ and $\epsilon_1$ are set respectively for the detected pressure value P and distortion value $\epsilon$, and the retreat process may be conducted if over these threshold values $P_1$ and $\epsilon_1$. Moreover, similarly, the return process may be carried out if the pressure value P and the distortion value $\epsilon$ decrease under the threshold values $P_1$ and $\epsilon_1$.

Then, the execution of the retreat process is triggered by an event that the pressure value P and the distortion value $\epsilon$ exceed the threshold values $P_1$ and $\epsilon_1$, respectively, and the execution of the return process may be triggered by an event that these values decrease under the threshold values $P_1$ and $\epsilon_1$, respectively. In this case, for instance, even in the case of detecting the pressure P equal to or larger than the threshold value $P_1$, owing to capability of the buffer material 76 described above, the DD unit 6 can be employed unless the distortion occurs in the housing 4, and the convenience can be enhanced. Moreover, e.g., even when the pressure value P is normal and if the distortion $\epsilon$ remains due to deformation of the housing 4, the magnetic head 14 can be prevented from the head-crash by not returning the magnetic head 14.

The pressure value P or the distortion value $\epsilon$ exceeds any one of the threshold values, in which case the safety of the magnetic head 14 is enhanced by executing the retreat process. Further, if under any one of the threshold values, the DD unit 6 is used at the early stage by executing the return process, and the convenience is enhanced.

Further, in the fourth embodiment also, as described above, there may be set the threshold values $P_1$ and $\epsilon_1$ for starting the retreat process and the threshold values $P_2$ and $\epsilon_2$ for starting the return process.

Fifth Embodiment

A fifth embodiment exemplifies a case of including a process of confirming the execution of the magnetic head retreat process.

Figure 24:
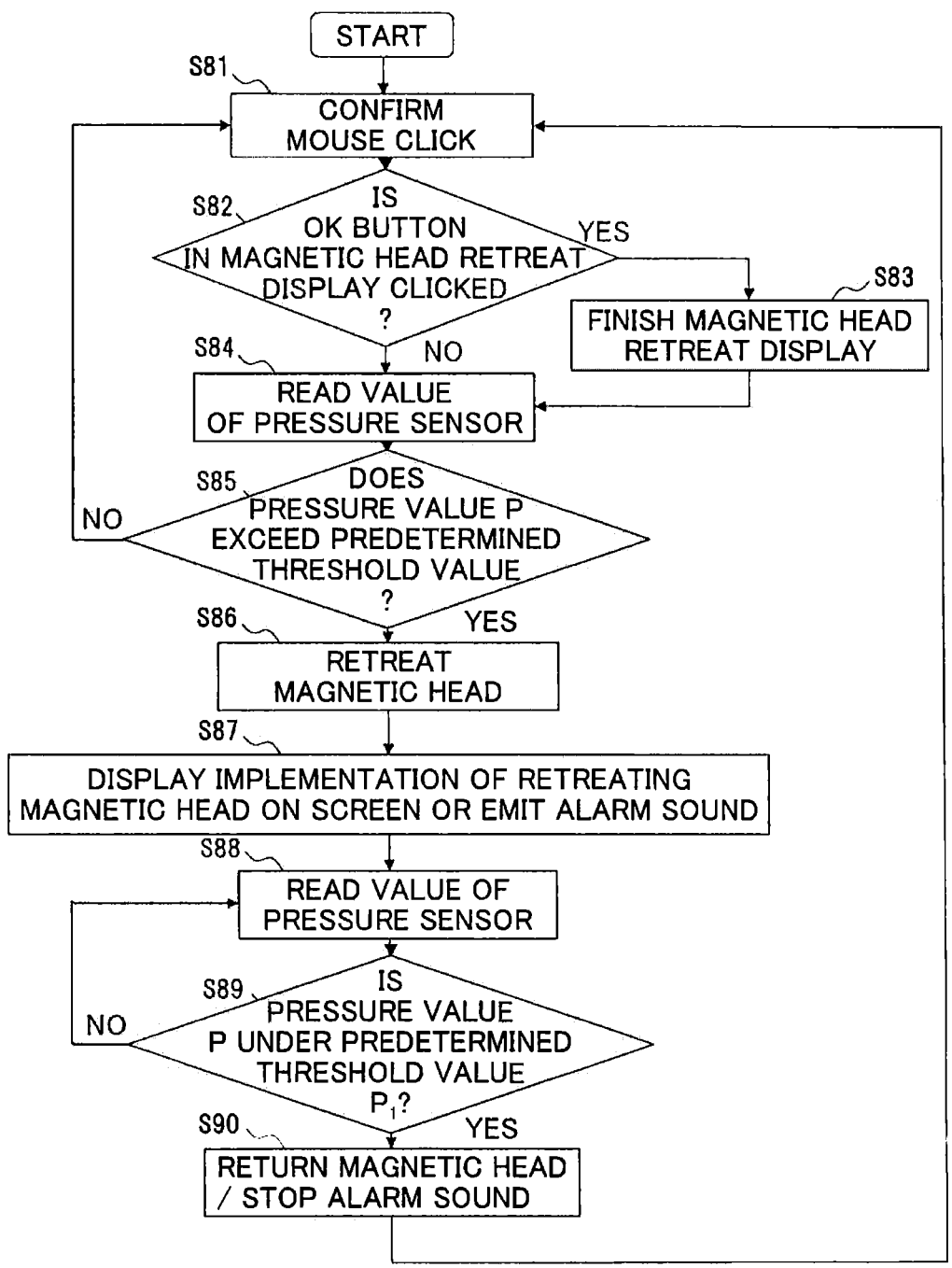
FIG. 24 is a flowchart illustrating the processing procedure of protecting the magnetic disk drive unit according to a fifth embodiment.

The reference to FIG. 24 will be made with respect to the fifth embodiment. FIG. 24 is a flowchart illustrating a processing procedure of protecting the DD unit according to the fifth embodiment. Note that the processing content or the processing procedure depicted in FIG. 24 is one example, and the embodiment is not limited to this example.

This protection process is one example of the protection method or the protection program of the information processing apparatus, and includes confirming the execution of the retreat process before the retreat process of the magnetic head on the basis of the detected pressure value P.

Then, for example, it is confirmed that a click by the mouse 58 (FIG. 4) of the input unit 44 of each of the PC 20A, PC 20B and PC 20C is done (step S81). Subsequently, it is determined whether or not an OK button, of the magnetic head retreat display, is clicked by the mouse 58 (step S82). That is, e.g., an execution confirming screen is displayed on the display unit 40 for confirming the execution of the magnetic head retreat process, and it is determined that the OK button representing the confirmation made by the user is clicked. If the OK button is clicked (YES in step S82), the magnetic head retreat display on the display unit 40 is finished (step S83).

Then, whereas if the OK button in the magnetic head retreat display is not clicked (NO in step S82) or if the magnetic head retreat display is finished (step S83), the operation shifts to the pressure monitoring process (step S84), and the retreat process of the magnetic head 14 is started.

Note that the processes in steps S84 through S90 correspond, it may be sufficient, to steps S21 through S29 (FIG. 13) as the processes given in the embodiment discussed above, and their descriptions are omitted.

Further, in the fifth embodiment, the pressure is used as the detection target, however, as stated above, the distortion of the housing may also be detected. Moreover, the threshold values for retreating and returning the magnetic head may also be set to different values, respectively.

Comparative Example

Figure 25:
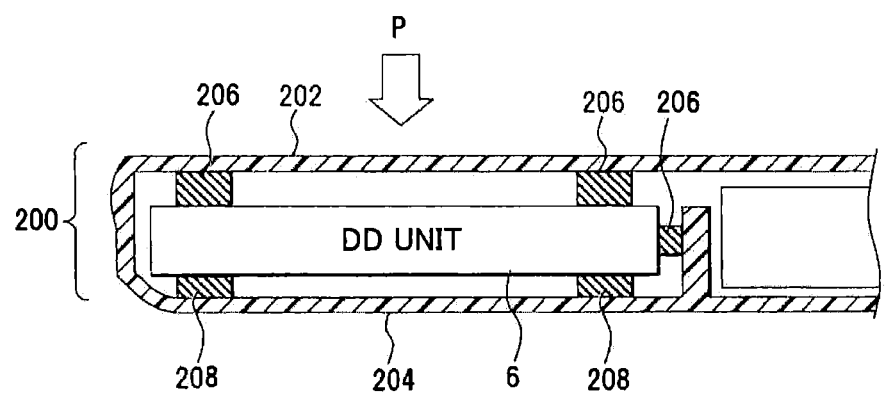
FIG. 25 is a view illustrating a comparative example.

Next, the reference to FIG. 25 will be made with respect to a comparative example of the embodiment discussed above. FIG. 25 is a diagram illustrating the comparative example.

This comparative example exemplifies a configuration of, e.g., a PC 200 mounted with the DD unit 6. Conventionally, the PC 200 mounted with the DD unit 6 having a size of, e.g., 2.5 in is equipped with buffer materials 206, 208, composed of rubbers, between an internal housing unit 202 and the DD unit 6 and between an external housing unit 204 and the DD unit 6 against the pressure P applied from the outside. The buffer material 206 of these buffer materials is installed on the upper side of the DD unit 6 and is constructed as thick as approximately 4 mm. Furthermore, the buffer material 208 is installed on the lower side of the DD unit 6 and is constructed to be, e.g., 1.5 mm in thickness.

Namely, in the configuration illustrated in this comparative example, it is required for strengthening the protection structure of the DD unit 6 to provide the much thicker buffer materials 206, 208, resulting in such a demerit that the PC 200 is upsized on the whole but cannot be thinned in shape.

By contrast, in the information processing apparatus of the present disclosure, the protection method thereof and the protection program thereof, the pressure sensor 8A and/or the distortion sensor 8B are/is provided along with the protection by the buffer material 76, and the retreat process of the magnetic head 14 is executed corresponding to the detection results thereof. For example, the pressure sensors 8A, which are 0.2 mm in thickness, are mounted on the upper and lower surfaces of the DD unit 6, and the buffer materials 76, which are 1 mm in thickness, are provided up and down. With this arrangement, the PC 20A or 20B can be decreased in thickness by, e.g., 3.5 mm. Further, the PC 20A or 20B can be configured thin to reduce its volume, whereby the weight can be reduced by, e.g., approximately 50-100 g.

Figure 26:
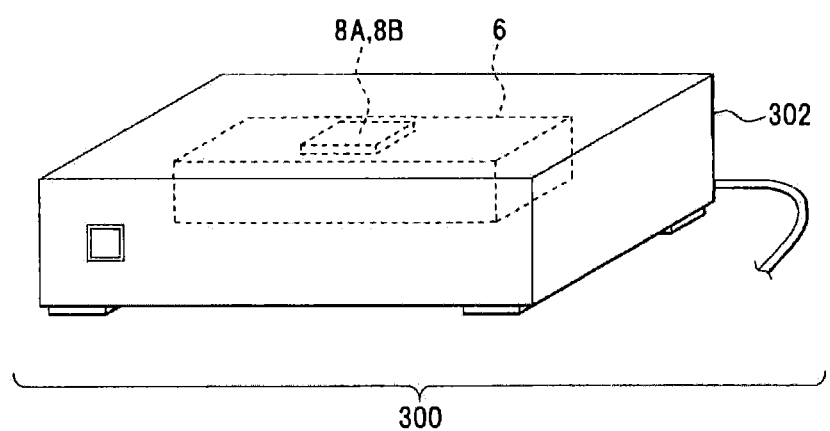
FIG. 26 is a view depicting an external storage device according to another embodiment.

Other Embodiments (1) In the embodiments discussed above, the PC 20 is exemplified by way of one example of the information processing apparatus, however, the embodiment is not limited to this example. Such being the case, for instance, as depicted in FIG. 26, the information processing apparatus may be applied to an external storage device 300 mounted with the DD unit 6. Further, as illustrated in FIGS. 27 and 28, the information processing apparatus may also be applied to a mobile phone 400 and a PDA (Personal Digital Assistant) 500.

In the external storage device 300, as illustrated in FIG. 26, the DD unit 6 is housed inside the housing unit 302 thereof. Subsequently, the buffer materials 76 for holding the DD unit 6 and the pressure sensor 8A and/or the distortion sensor 8B are provided on the upper and lower sides inwardly of the housing unit 302. Then, these components may be configured similarly to the embodiments discussed above, and their descriptions are omitted.

Figure 27:
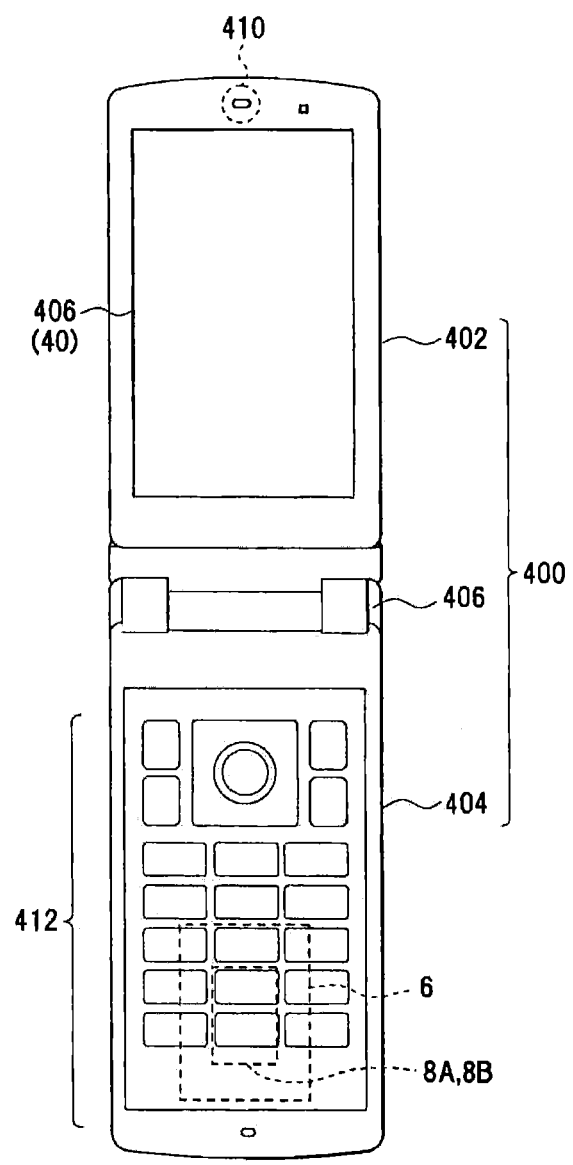
FIG. 27 is a view depicting a mobile phone according to another embodiment.

Moreover, in the mobile phone 400, as depicted in FIG. 27, for example, a display side housing unit 402 and an operation side housing unit 404 are joined in the openable/closable manner through a hinge 406. The display side housing unit 402 is equipped with a display unit 408, a receiver 410, etc., while the operation side housing unit 404 is equipped with an operation input unit 412 etc. Then, for example, the DD unit 6 is housed inside the operation side housing unit 404, and, as described above, it may be sufficient that the buffer material 76, the pressure sensor 8A, etc. are built up.

Figure 28:
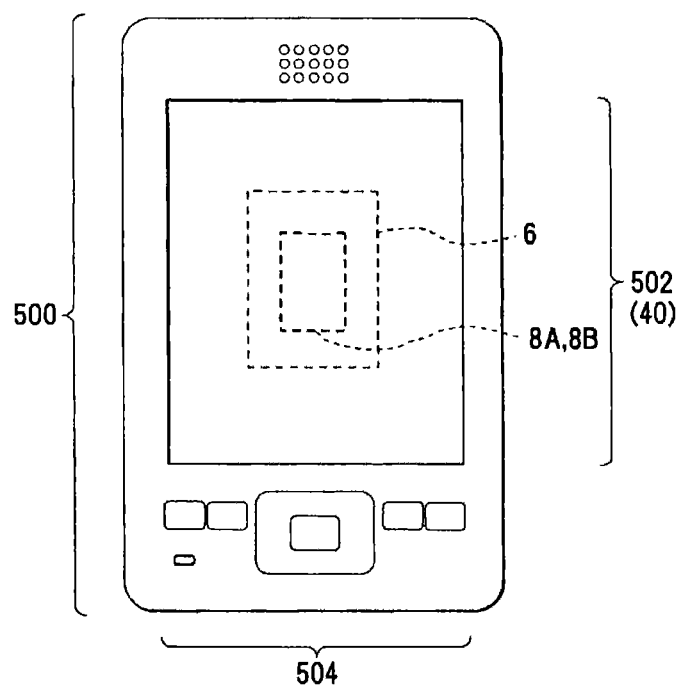
FIG. 28 is a view depicting a Personal Digital Assistant according to another embodiment.

Further, the PDA 500 includes, as illustrated in FIG. 28, a display unit 502, an operation unit 504, etc. Then, the DD unit 6 is contained in an interior of the PDA 500 in the same way as described above, and it may be sufficient that the buffer material 76, the pressure sensor 8A, etc. are built up.

According to such a configuration, there is detected the pressure applied to the flat surface of the built-in magnetic disk 12 or the distortion caused in the housing with respect to the DD unit 6 mounted in the external storage device 300, the mobile phone 400 or the PDA 500. Then, the retreat process of the magnetic head 14 is carried out corresponding to the detection results, whereby the head-crash of the magnetic head 14 can be prevented. Further, the structure peripheral to the DD unit 6 can be more simplified, and the apparatus can be downsized while enhancing the protection function.

(2) In the embodiment discussed above, it is determined, as the determination for shifting to the retreat process or the return process of the magnetic head 14, only whether or not the detected pressure value or distortion value is equal to or larger than the threshold value, however, the embodiment is not limited to these determinant factor. For example, changes of the measured pressure value and distortion value may also be taken into consideration. Namely, the detected pressure value and distortion value are stored, and, for instance, it may be determined whether or not the magnetic head 14 is to be retreated, on the basis of making a determination, as to whether or not the value is in the ascending tendency with an elapse of the time. Further, it is similarly determined, during the execution of the retreat process, whether or not the detected value is in the descending tendency, thereby enabling the safety to be enhanced and enabling iterations of the retreat process to be prevented by, e.g., not returning the magnetic head if the detected value temporarily becomes equal to or smaller than the threshold value.

(3) In the embodiment discussed above, after retreating the magnetic head 14, the pressure value and the distortion value are continuously monitored, and the operation shifts to the return process if under the threshold value, however, the embodiment is not limited to this return mode. For example, the return of the magnetic head 14 may be triggered by the operation such as the user's clicking the confirmation display icon 92 (FIG. 14) in the alarm display. For others, the operation on the information processing apparatus (PC 20) may not be accepted till manipulating the confirmation display icon 92 even when returning the magnetic head 14.

According to such a configuration, the user of the information processing apparatus can be made aware of a possibility that the magnetic disk 12 undergoes the excessive external force and might be broken down, thereby enabling the information processing apparatus to be protected.

(4) In the embodiment discussed above, the MPU 36 acquires the detected values of the pressure sensor 8A and the distortion sensor 8B and makes the determination, and the CPU 32 outputs the retreat instruction etc. of the magnetic head 14 on the basis of the determination result, however, the embodiment is not limited to this output mode. For example, the MPU 36 may also output this retreat instruction directly to the side of the DD unit 6.

As discussed above, the most preferred embodiments of the present invention have been described, however, the present invention is not limited to the descriptions given above, but, as a matter of course, a variety of modifications and changes can be made, by those skilled in the art, on the basis of the gist of the invention described in the claims or disclosed in the specification, and it goes without saying that these modifications and changes are embraced by the scope of the present invention.

INDUSTRIAL APPLICABILITY

The information processing apparatus, the protection method thereof or the protection program thereof of the present disclosure are useful enough to be capable of preventing the magnetic disk drive unit, from breaking down due to the external force, by detecting the pressure applied to the housing unit of the information processing apparatus or the distortion thereof and retreating the magnetic head.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

The invention claimed is:

1. An information processing apparatus comprising:
   a housing;
   a magnetic disk drive unit to be installed within the housing;
   a sensor installed between the housing and the magnetic disk drive unit to detect pressure acting on the housing or a distortion caused in the housing by dint of the pressure; and
   a control unit to retreat a magnetic head of the magnetic disk drive unit to a retreat area when the pressure or the distortion, detected by the sensor, exceeds a predetermined level.

2. The information processing apparatus according to claim 1, wherein the control unit, after retreating the magnetic head, returns the magnetic head remaining retreated to above the magnetic disk when the pressure or the distortion, detected by the sensor, decreases down to or under the predetermined level.

3. The information processing apparatus according to claim 1, further comprising a recording unit,
   wherein at least retreat information of the magnetic head is recorded in the recording unit.

4. The information processing apparatus according to claim 1, further comprising a message output unit,
   wherein when the pressure or the distortion exceeds the predetermined level, the message output unit outputs a message representing this purport.

5. The information processing apparatus according to claim 1, wherein the sensor is a pressure sensor to detect a pressure acting on the housing.

6. The information processing apparatus according to claim 1, wherein the sensor is a distortion sensor to detect a distortion caused in the housing by dint of the pressure.

7. The information processing apparatus according to claim 1, wherein a vibration absorbing member is installed between the sensor and the housing.

8. A protection method of an information processing apparatus, comprising:
   detecting pressure acting on the housing in which a magnetic disk drive unit is installed or a distortion caused in the housing by dint of the pressure; and
   retreating a magnetic head of the magnetic disk drive unit to a retreat area when the pressure or the distortion exceeds a predetermined level.

9. The protection method of the information processing apparatus according to claim 8, further comprising outputting, when the pressure or the distortion exceeds the predetermined level, a message representing this purport.

10. A non-transitory computer readable medium storing a protection program which makes an information processing apparatus mounted with a magnetic disk drive unit execute:
    monitoring pressure acting on the housing in which a magnetic disk drive unit is installed or a distortion caused in the housing by dint of the pressure; and
    retreating the magnetic head of the magnetic disk drive unit to a retreat area when the pressure or the distortion exceeds a predetermined level.

11. The non-transitory computer readable medium according to claim 10, wherein the information processing apparatus executes, outputting, when the pressure or the distortion exceeds the predetermined level, a message representing this purport.

* * * * *